United States Patent
Morton et al.

(10) Patent No.: US 10,660,324 B2
(45) Date of Patent: May 26, 2020

(54) LONG-LIFE-LIGHT SYSTEM FOR DETERRING RATS, MICE AND SIMILAR PETS

(71) Applicants: Richard G. Morton, San Diego, CA (US); Kenneth Avicola, Port Ludlow, WA (US); Curtis Mixon, Encinitas, CA (US); John R. Ross, Del Mar, CA (US)

(72) Inventors: Richard G. Morton, San Diego, CA (US); Kenneth Avicola, Port Ludlow, WA (US); Curtis Mixon, Encinitas, CA (US); John R. Ross, Del Mar, CA (US)

( * ) Notice: Subject to any disclaimer, the term of this patent is extended or adjusted under 35 U.S.C. 154(b) by 0 days.

(21) Appl. No.: 15/999,951

(22) Filed: Sep. 5, 2018

(65) Prior Publication Data
US 2019/0141983 A1 May 16, 2019

Related U.S. Application Data

(60) Provisional application No. 62/707,779, filed on Nov. 16, 2017.

(51) Int. Cl.
| | | |
|---|---|---|
| A01M 29/10 | (2011.01) | |
| F21S 10/06 | (2006.01) | |
| F21S 10/02 | (2006.01) | |
| F21V 23/00 | (2015.01) | |
| B60R 99/00 | (2009.01) | |
| F21V 23/04 | (2006.01) | |
| F21S 9/02 | (2006.01) | |
| F21Y 115/10 | (2016.01) | |
| F21Y 113/13 | (2016.01) | |

(52) U.S. Cl.
CPC ............. *A01M 29/10* (2013.01); *B60R 99/00* (2013.01); *F21S 9/02* (2013.01); *F21S 10/023* (2013.01); *F21S 10/06* (2013.01); *F21V 23/003* (2013.01); *F21V 23/0407* (2013.01); *B60R 2099/005* (2013.01); *F21Y 2113/13* (2016.08); *F21Y 2115/10* (2016.08)

(58) Field of Classification Search
CPC .......... A01M 29/10; F21S 9/02; F21S 10/023; F21S 10/06; F21V 23/003; F21V 23/0407; F21V 2113/13; F21V 2115/10; B60R 99/00; B60R 99/005
See application file for complete search history.

(56) References Cited

U.S. PATENT DOCUMENTS

| | | | | |
|---|---|---|---|---|
| 5,122,781 A | * | 6/1992 | Saubolle | B60Q 7/00 116/63 P |
| 6,710,705 B1 | * | 3/2004 | Smith | A01M 29/10 340/384.2 |

(Continued)

*Primary Examiner* — David E Smith
(74) *Attorney, Agent, or Firm* — John R. Ross

(57) ABSTRACT

A system is disclosed for keeping rats and similar pests away without trapping or killing them. It provides a long-life battery powered LED light system for deterring rats, mice and other nocturnal animals. Embodiments of the present invention are designed to operate continuously for at least one year between battery changes. Embodiments have been proven to deter rats from invading engine compartments of parked motor vehicles, vegetable gardens, attics, garages and outdoor patios. In preferred embodiments the wavelengths of the LEDs are chosen to correspond to the known wavelength sensitivity peaks of the eyes of rats, mice, and other rodents. This new technology transcends traps.

28 Claims, 17 Drawing Sheets

(56) References Cited

U.S. PATENT DOCUMENTS

| | | | | |
|---|---|---|---|---|
| 2005/0122713 A1* | 6/2005 | Hutchins | ............ | F21L 4/027 |
| | | | | 362/205 |
| 2006/0050511 A1* | 3/2006 | De Ginto | ............ | A01M 29/10 |
| | | | | 362/257 |
| 2007/0159816 A1* | 7/2007 | Bayat | ............ | F21L 4/027 |
| | | | | 362/184 |
| 2010/0226122 A1* | 9/2010 | Tsai | ............ | A01M 29/10 |
| | | | | 362/231 |
| 2013/0249693 A1* | 9/2013 | Neal | ............ | A01M 29/10 |
| | | | | 340/573.2 |
| 2014/0144067 A1* | 5/2014 | Shefer | ............ | A01M 29/10 |
| | | | | 43/132.1 |
| 2014/0245969 A1* | 9/2014 | Wu | ............ | A01M 29/00 |
| | | | | 119/712 |
| 2016/0338337 A1* | 11/2016 | Waldman | ............ | A01M 31/002 |
| 2018/0139950 A1* | 5/2018 | Bishop | ............ | A01M 29/10 |

* cited by examiner

LONG-LIFE-LIGHT SYSTEM FOR DETERRING RATS, MICE AND SIMILAR PETS

CROSS REFERENCE TO RELATED APPLICATIONS

The present invention claims the benefit of Provisional Patent Application 62/707,770 filed Nov. 16, 2017.

FIELD OF THE INVENTION

The present invention relates to light systems for deterring rats, mice and similar pests.

BACKGROUND OF THE INVENTION

Rats, Mice and Other Similar Pests

The common species of rats are opportunistic survivors and often live with and near humans; therefore, they are known as commensals. They may cause substantial food losses, especially in developing countries. Wild rodents, including rats, can carry many different zoonotic pathogens. The Black Death is traditionally believed to have been caused by the micro-organism *Yersinispestis* is carried by the tropical rat flea *Xenopsyllacheopis* which preyed on black rats living in European cities during the epidemic outbreaks of the Middle Ages. These rats were used as transport hosts. Another zoonotic disease linked to the rat is the foot-and-mouth disease. The average lifespan of any given rat depends on which species is being discussed, but many only live about a year due to predation. The black and brown rats diverged from other Old World Rats during the beginning of the Pleistocene in the forests of Asia. Fifty-thousand people each year receive rat bites. The rats destroy crops and property. So, when they show up in your home, it's hard to stay calm.

Even though rats can weigh up to 18 ounces, you don't always see them. Most people discover rats by seeing signs of their presence. Look for droppings near food sources. Also, rats follow the same pathways as they search for food, so they leave greasy marks along sideboards and walls. Rats need to gnaw to keep their teeth sharp, so look for chew marks on wood around the house. Go outside and see if you can find any holes in the ground that weren't there before. Rats always stay fairly close to their nests, which could be in the yard or the house. Rats can eat just about anything and, while they require more than mice, rats do not need a great deal of food (1-3 oz. daily). Rats like to nest in the engine compartment of trucks and automobiles. They have been known to cause thousands of dollars damage mainly by chewing the covers of electrical wiring, chewing through thermal insulation and invading glove compartments and other dashboard regions. Rats will also bring food into engine compartments to "dine" in safety. Another major problem is caused by the rat's desire to eat plants and fruits in city and suburban gardens.

"If a man can build a better mousetrap than his neighbors, though he builds his house in the woods, the world will beat a path to his door", is a phrase attributed to Ralph Waldo Emerson in the late nineteenth century. The phrase has turned into a metaphor about the power of innovation and is frequently taken literally, with more than 4,400 patents issued by the United States Patent and Trade Mark Office for new mousetraps, with thousands more unsuccessful applicants, making them the "most frequently invented device in U.S. history". The popular modern snap-trap version of the mousetrap was invented in Litiz, Pa. by John Mast in 1899, several years after the Emerson misquote had become popular.

Many methods have been proposed to control rats and mice. Traps or baits can be used stand alone or together as part of a system of rodent control to make sure you cover all bases. A trap physically holds the rodent in place. This is ideal if you want proof that the rodent was caught or for tracking purposes. Trap types include glue traps, mechanical traps, or even catch-and-release traps. But many people cannot stand seeing the rat once it's caught. Also, many people have no desire to kill a wild animal, even rats. Poisoned bait can also be used to kill rats but there are problems with this approach. A poisoned rat will normally go to its nest to die and the resulting odor can be a problem. More importantly, the poison might enter the food chain if consumed by predators or scavengers or cause the death of household pets.

Rats have been a problem for people throughout human history. They eat or spoil crops, can spread disease, and damage property: There are stories of old wooden ships sinking because rats had gnawed through them. What we have said about rats also applies to a large extent to mice and similar pests. What is needed is a better method for solving problems related to rats, mice and similar pests.

Light Emitting Diodes

Appearing as practical electronic components in 1962, the earliest LEDs emitted low-intensity infrared light. Infrared LEDs are still frequently used as transmitting elements in remote-control circuits, such as those in remote controls for a wide variety of consumer electronics. The first visible-light LEDs were of low intensity and limited to red. Modern LEDs are available across the visible, ultraviolet, and infrared wavelengths, with very high brightness.

SUMMARY OF THE INVENTION

The present invention keeps rats and mice away without trapping or killing them. Preferred embodiments provide a long-life battery powered LED light system for deterring rats, mice and other nocturnal animals. Preferred embodiments of the present invention are designed to operate continuously or in a pulse mode for at least one year between battery changes. Embodiments have been proven by Applicants to deter rats from invading engine compartments of parked motor vehicles, large enclosed open spaces such as attics and vegetable gardens. The wavelengths of the LEDs are chosen to correspond to the known wavelength sensitivity of the eyes of rats. Applicants have compared their invention to all other methods of deterring or killing rats, mice and other similar pests based on all relevant factors including cost, effectiveness, convenience and we are convinced we have built a better device for controlling rats, mice and similar pests so that, even if we lived in the forest, the world would beat a path to our door.

Initial designs utilized blue (460 nm) LEDs and were experimentally verified to deter rats. These blue LEDs just happened to be at hand when applicants first tried to deter rats with light. As described in the following sections of this application, the applicants later discovered the spectral response of the rat eye, peaking in the UV and green portions of the wavelength spectrum. Our subsequent improved designs, and the recent availability of low cost UV LEDs resulted in the later designs described in this application.

The effectiveness of these designs was also experimentally verified to be better than the earlier, 460 nm blue LED designs.

Preferred embodiments of the present invention comprise at least one LED designed to emit light peaking at wavelengths within the UV peak in the absorbance spectrum of rat's eyes or within the green peak in the absorbance spectrum of rat's eyes, and a battery powered electric circuit designed to power the at least one LED for a period of at least one year without replacement or recharging of the battery. In another preferred embodiment, the wavelengths chosen are at both the green wavelength and UV sensitivity peaks. Specific preferred wavelengths are within 50 nm of the 509 nm peak in the green spectra, and 26 nm of the 359 nm ultraviolet peak in the ultraviolet spectra. LED light within these wavelength ranges is very effective in deterring rats and mice. Wavelengths close to but outside of these ranges will deter rats and mice but not as effectively or as efficiently as light within these ranges. Preferably the embodiments should be as close to one or both peaks as feasible.

Key Technical Issues Addressed by the Invention

It is known that rats and mice are nocturnal foragers. Their eyesight is well adapted to very low illumination levels. The sharpness of the images they "see" is nowhere near as good as human vision. Some comparisons have been made to human vision that put rat or mouse vision at the 20/600 level. (Prusky et al Behavioral Assessment of Visual Activity in mice and rats, Vision Res 2000, PubMed.gov) However, they can use their UV visual sense at much lower light levels than can humans. This is one reason why rodents are strongly averse to light at specific wavelengths when foraging or exploring their surroundings. Good evidence of this is that the rodents are strongly averse to light produced by Applicants' prototype products.

It is therefore possible to take advantage of rodent light sensitivity to keep them out of enclosed spaces. Two well-known places where rodents are known to cause costly damage are automobile engine compartments, and household attics. Their chewing of electrical wiring is particularly damaging as it can cause fire-hazard conditions as well as disrupting multiple normal operating functions of electrical and electronic control systems found in modern vehicles. For instance: driver-assist packages like auto-braking could be compromised.

Efficient Uses

In order to maximize the level of deterrence caused by interfering with the rodent's "night-vision", which causes them to recoil from or simply not enter illuminated spaces, it is obvious that the brighter the deterring light source, the better. However, producing "brighter" light uses more energy from the source producing the illumination. When it is desired to produce sufficient light for deterrence for long periods of time, high efficiency conversion of stored electrochemical energy to light that deters rodents is very important.

Designing a system with efficient production of light, at levels sufficient to repel rodents is dependent on knowledge of their sensitivity to various colors, or wavelengths of light. It would be wasteful of energy to generate light at wavelengths to which they are not very sensitive, or actually "blind". Rodents are effectively "blind" at "red" wavelengths above about 600 nm, for example. This issue is addressed in detail in the Detailed Description section.

The goal of the invention is to efficiently convert the energy stored in batteries to light at wavelengths that match the two known sensitivity peaks in rodents, to maximize the effectiveness of the light in repelling them. This, in turn, maximizes the operating lifetime of the optical deterrent invention, with no dependence on external energy sources. This energy independence allows the invention to have a very compact embodiment, with no wires needed for an external energy supply. These compact embodiments allow convenient placement in engine compartments and eliminates any connections to the vehicle electrical system. Such connections could cause safety problems, and possibly void the manufacturer's warranty on the vehicle in which the device is installed.

SPECIFIC EMBODIMENTS

Specific embodiments of the present invention include LED lighting systems for deterring rats and similar pests comprising at least one LED unit designed to emit light peaking at wavelengths within:
    50 nm of the 509 nm peak of the green sensitivity spectrum of rat's eyes, or
    26 nm of the 359 nm peak of the ultraviolet sensitivity spectrum of rat's eyes,
The claimed wavelength ranges are:
    Green: 459 nm to 559 nm, centered at 509 nm
    Ultraviolet: 333 nm to 385 nm, centered at 359 nm
Photon energy corresponding to the peak wavelengths are;

|  | Peak Wavelengths | Energy | |
|---|---|---|---|
| Green | 509 nm | 2.43 Electron-Volts | $3.90 \times 10^{-19}$ Joules |
| Ultraviolet | 359 nm | 3.45 Electron-Volt | $5.09 \times 10^{-19}$ Joules |

Systems can be designed for continuous operation or for pulse operation. Systems can utilize one or more LEDs and the colors can be a single color or a combination of colors. Systems can flash two separate colors such as ultraviolet and green alternatively. Strip LEDs can be utilized in some embodiments which could be pulsed at a variety of rates or operated continuously. The systems can be designed to provide the degree of coverage desired.

In one embodiment a red LED is utilized for reasons provided below, even though rats cannot see it. Strip LEDs are utilized in some embodiments which could be pulsed at a variety of rates, or continuously. The systems can be designed to provide 360 degree coverage with one color or two colors or more.

DETAILED DESCRIPTION OF PREFERRED EMBODIMENTS

How Rats Use Ultraviolet Light

Although it is not precisely known why rats are sensitive to UV, at wavelengths where humans are totally blind, one of the functions is related to the ability to see urine trails left by other rats. This may help to reduce conflicts among differing rat groups, and generally to help navigate to areas where food sources might be available. It is also thought that at times of dawn or dusk, it could help them to spot overhead predators as silhouettes against a "brighter" UV skylight. The scattering behavior at dawn or dusk of shorter wavelengths in Earth's atmosphere, known as Rayleigh Scattering, makes the "UV sky" brighter than the visible wavelength sky. This is only useful to rodents when direct solar illumination or scatter of illumination by clouds or mountains has disappeared.

Rat Vision Spectrum

Figure 10:
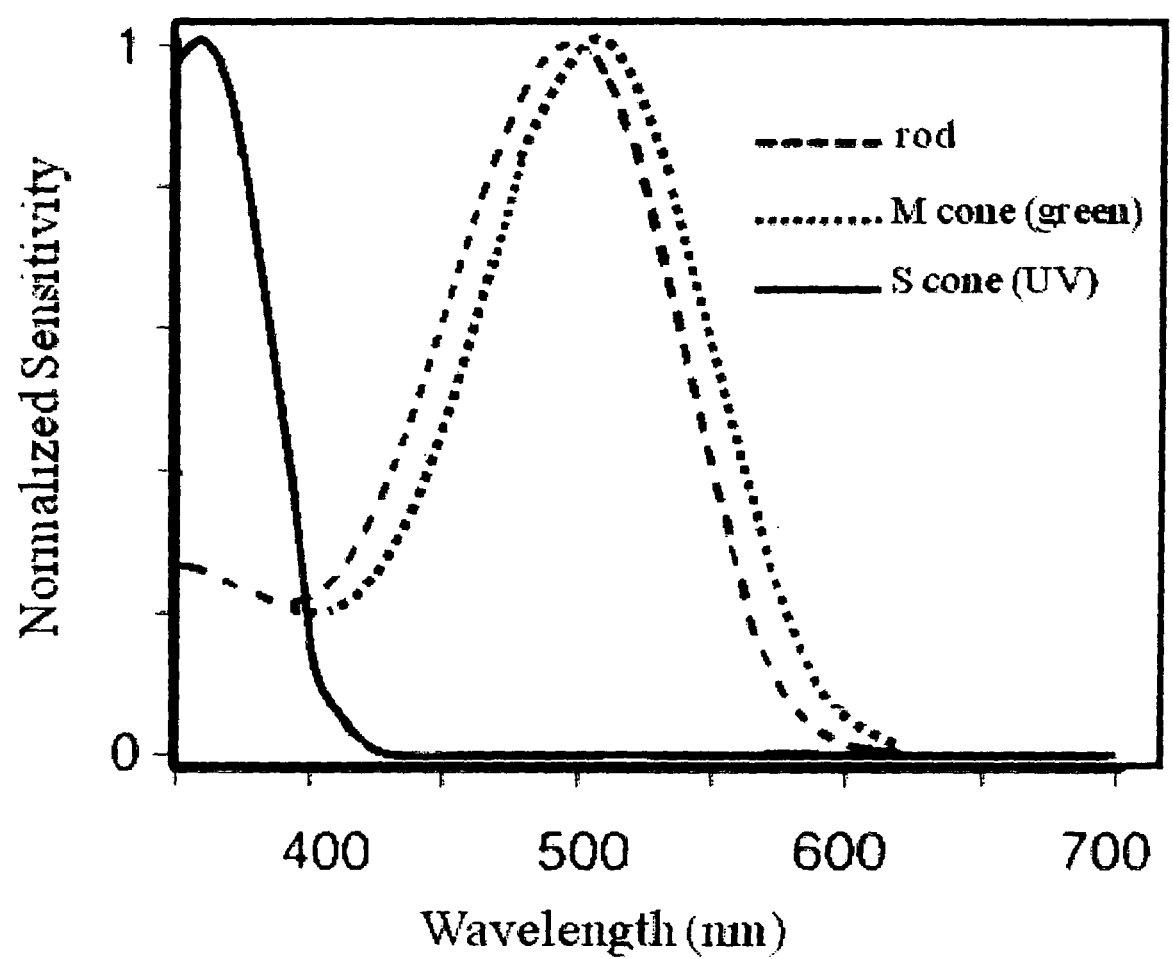
FIG. 10 shows the normalized spectral response of rats and mice from a 2011 Wang reference.

The spectral sensitivity of rodents has been studied extensively. The eyes of rats have evolved for nighttime activity. Their retina with rods and cones is similar to many other mammals. Their cones are adapted to permit them to distinguish between ultraviolet light with a peak at 359 nm and visible light with a peak at 509 nm. FIG. 10 shows the experimentally derived sensitivity of mice to a broad range of wavelengths. The sensitivity curves for rats are very similar. Like humans, rats and mice have Rod and Cone photoreceptor cells in their retinae. Rods are more sensitive than Cones, but Cones result in wavelength sensitive vision. The labels in the graph show the response of rods and two types of Cone response, M (Green) cones and US (UV) cones. The curve labeled "M cones" shows rat sensitivity at wavelengths broadly centered around 509 nm. Humans share this spectral sensitivity with rodents. The curve labeled "S cones" (ultraviolet wavelength sensitive) shows rat sensitivity at wavelengths centered on 359 nm. Humans do not share this spectral sensitivity with rodents. This graph is taken from a paper by Yabin V. Wang et. al. J. Neurosci. 2011 May 25; 31(21): 7670-7681. A typical human eye will respond to wavelengths from about 390 nm to 700 nm. It is also noted that rats and mice have essentially the same visual spectral responses.

Note, as mentioned above, that rats have a visual sensitivity peak at UV wavelengths around 359 nm, which they perceive to be just as bright as green light at wavelengths around 520 nm. Humans share the sensitivity at the green wavelengths but have very low sensitivity to any wavelengths below about 390 nm. At 359 nm, human visual sensitivity is down by a factor of about 10,000 compared to their green sensitivity. Knowledge of the UV sensitivity in rodents was used in improving optical deterrence, because it leads to providing light at the rat's two most sensitive wavelengths; the second, UV wavelength not being obvious to humans both literally, and conceptually.

Historical Attempts to Use Light as a Deterrent to Animals

It has been well known for many years that bright light is an effective deterrent not only to rodents, but to larger animals such as raccoons. This of course consumes considerable power and was not reasonable in a self-contained portable device until LEDs came along. Efforts have been made to commercialize LED-based pest deterrent devices, but none are designed in a way that that are both bright enough to be effective and efficient enough to have very long battery life. For example, some have a lot of LEDs operating continuously and are bright, but do not have long (a year or more) battery life. Others use pulsed LEDs to save power by having a low duty cycle, like once per second, but involve operating the LEDs at tens of mA to get enough light. The efficiency of LEDs typically falls off above 10 mA. In Applicants' devices all of these problems are solved. Applicants have embodiments that operate in a pulsed mode, but near the LED peak efficiency in the 4-6 mA range. Then Applicants pulse at a higher repetition rate, such as 5 or 10 HZ, and adjust the pulse width to get enough average light output to deter rodents. Another benefit of pulse rates in this range is that they have an eye-catching startling effect, which may be because flickering lights in nature often indicate danger from fires and lightning strikes.

Importance of Matching Spectrum

Two LEDs Matched to Rat's Vision Peaks

Figure 2:
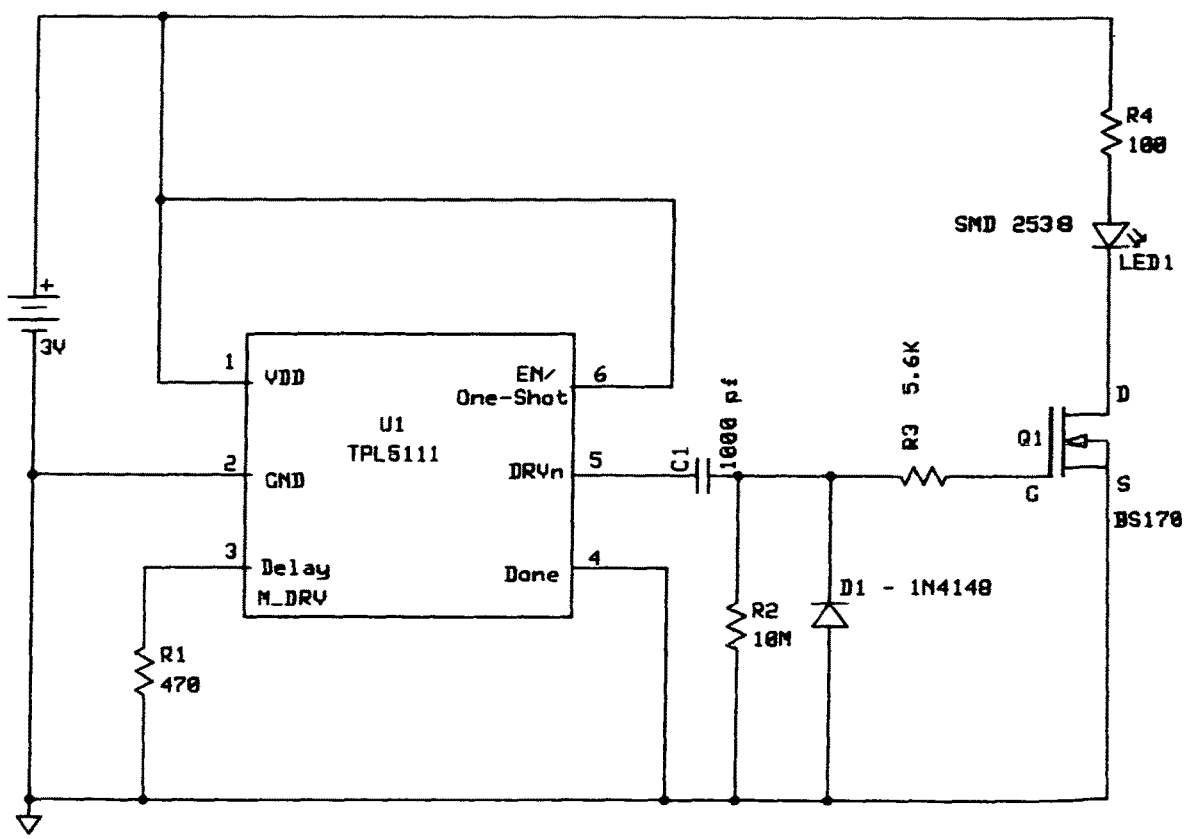
FIG. 2 shows a circuit using two 1.5-volt lithium batteries and one LED.
Figure 3:
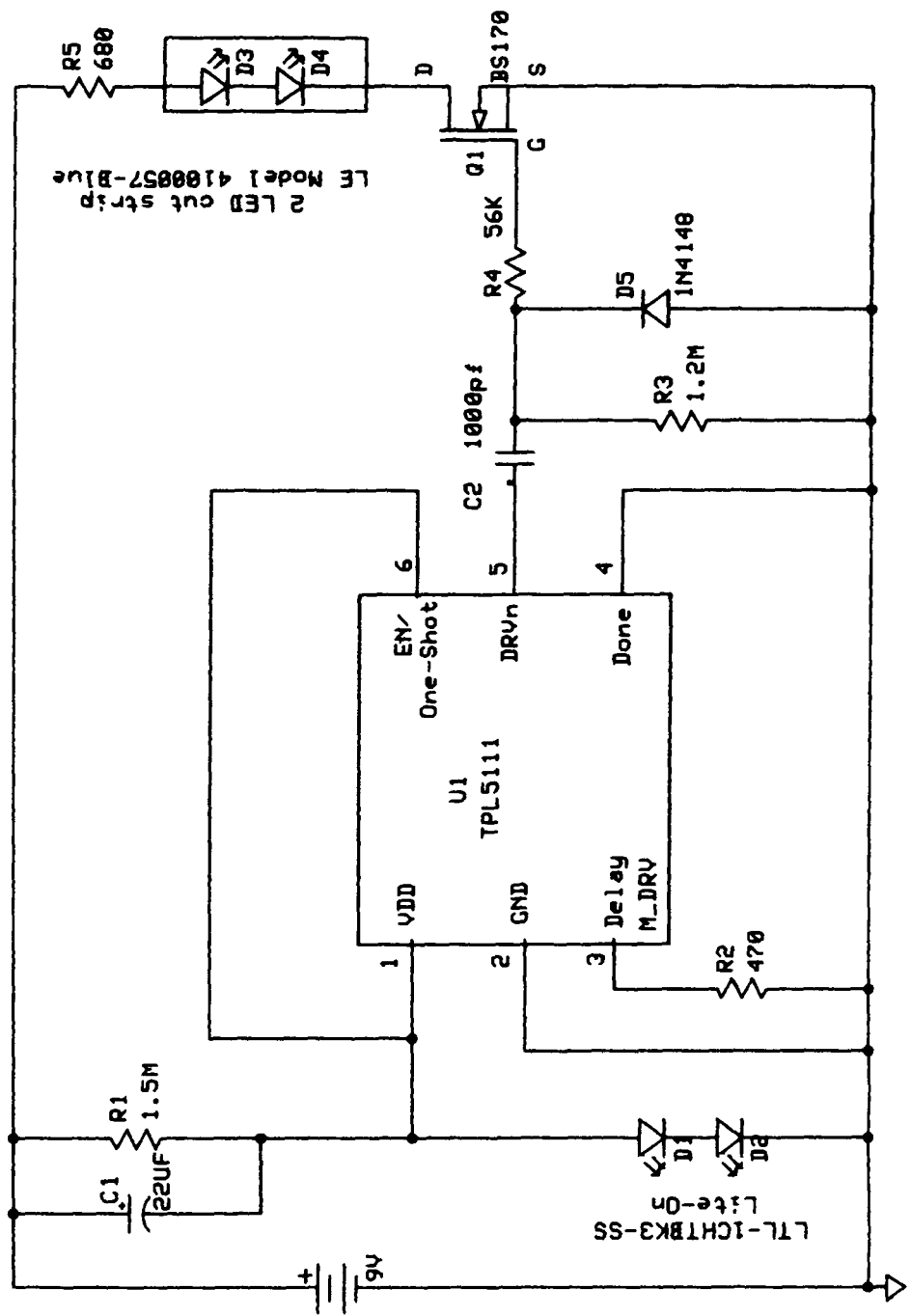
FIG. 3 shows a circuit using one 9-volt alkaline battery and two LEDs.
Figure 11:
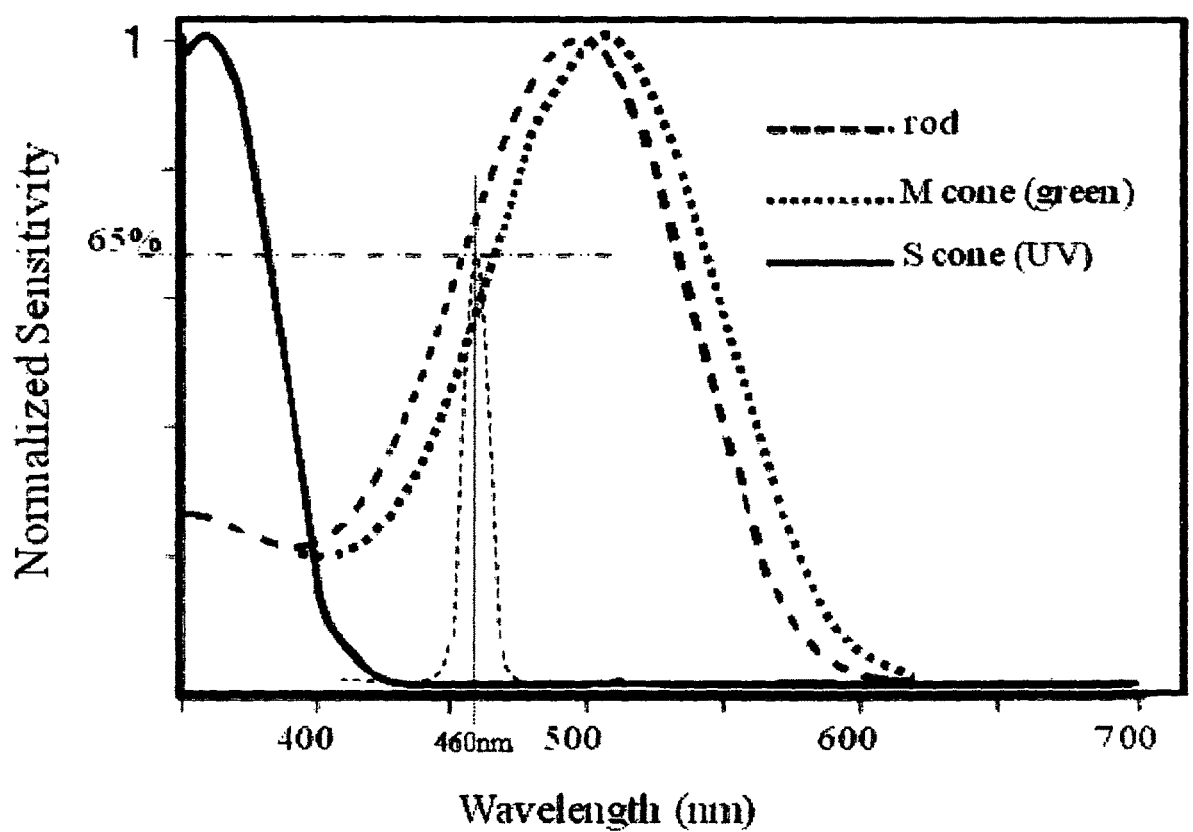
FIG. 11 shows the spectrum of a successfully tested 460-nm LED with about 65% of the sensitivity of the rat's green and ultraviolet peaks.
Figure 12:
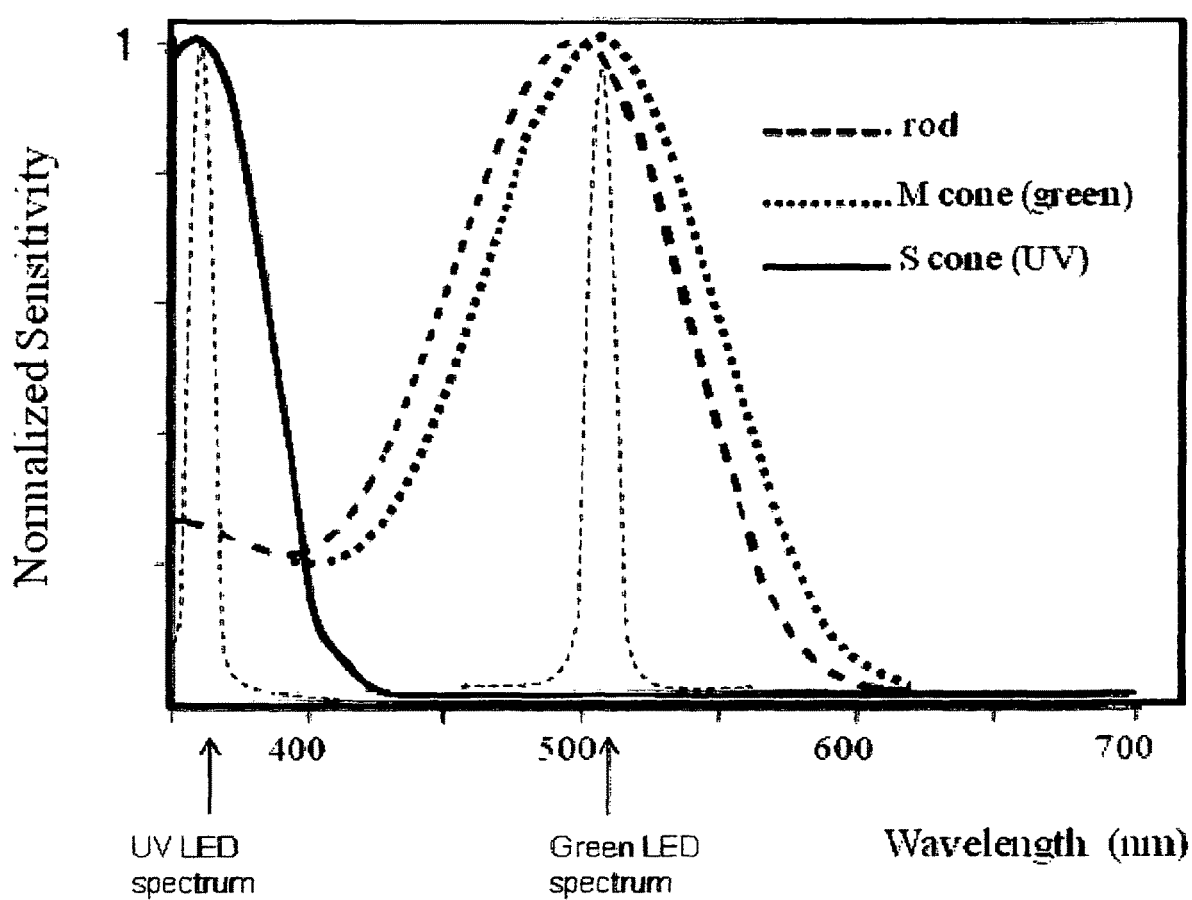
FIG. 12 shows two LEDs matched to the M cone and the S cone cells sensitivity peaks of rats and mice.

It is important that the wavelength of the LED's of the present invention be consistent with the visual sensitivity spectrum of the rat's eyes. For example, FIG. 12 shows two LEDs, one at 359 nm and the other at 509 nm exactly matching the sensitivity peaks of the rat(or mouse) eyes. Use of these LEDs for rat control would be excellent choices. However, as also shown in FIG. 2, the spectral range of the rat's sensitivity peaks is broad enough, that LEDs with peaks within 26 nm of the UV peak of the rat's spectral absorbance, or within 50 nm of the 509 nm of the green peak of the rat's spectral absorbance spectrum, would work about 90% as well. Applicants' first experiments with the present invention were with 460 nm blue LED's which are within 50 nm of the rat's 509 nm peak, and these experiments were very successful. FIG. 11 shows the spectral output. Applicants believe this might be because the 460 nm light was affecting both the M cones (used at relatively high light levels for imaging) and the rods, which are sensitive to much lower light levels. Another possible explanation for the successful use of blue LED is that rats never see "monochromatic" blue light in nature. Any blue they do see is part of a much broader, naturally occurring wavelength distribution.

There may be situations where the best choice would be to use an LED matched to the 509 nm green light peak and other situations where it would be best for the LED to be matched to the 359 nm UV peak. In other situations, a user may want to use two LEDs one at 359 nm and the other at 509 nm to match both peaks. We know from our experience that the 460 nm blue LED works successfully, although not as efficiently as in embodiments at the rat's peak sensitivity.

It is the careful design of the improved embodiments to optimize the efficiency of converting stored chemical energy to photons, to maximize operating lifetime in deterring rodents, that is the basis of the invention.

Specific Example of the Importance of Spectral Matching

Figure 17:
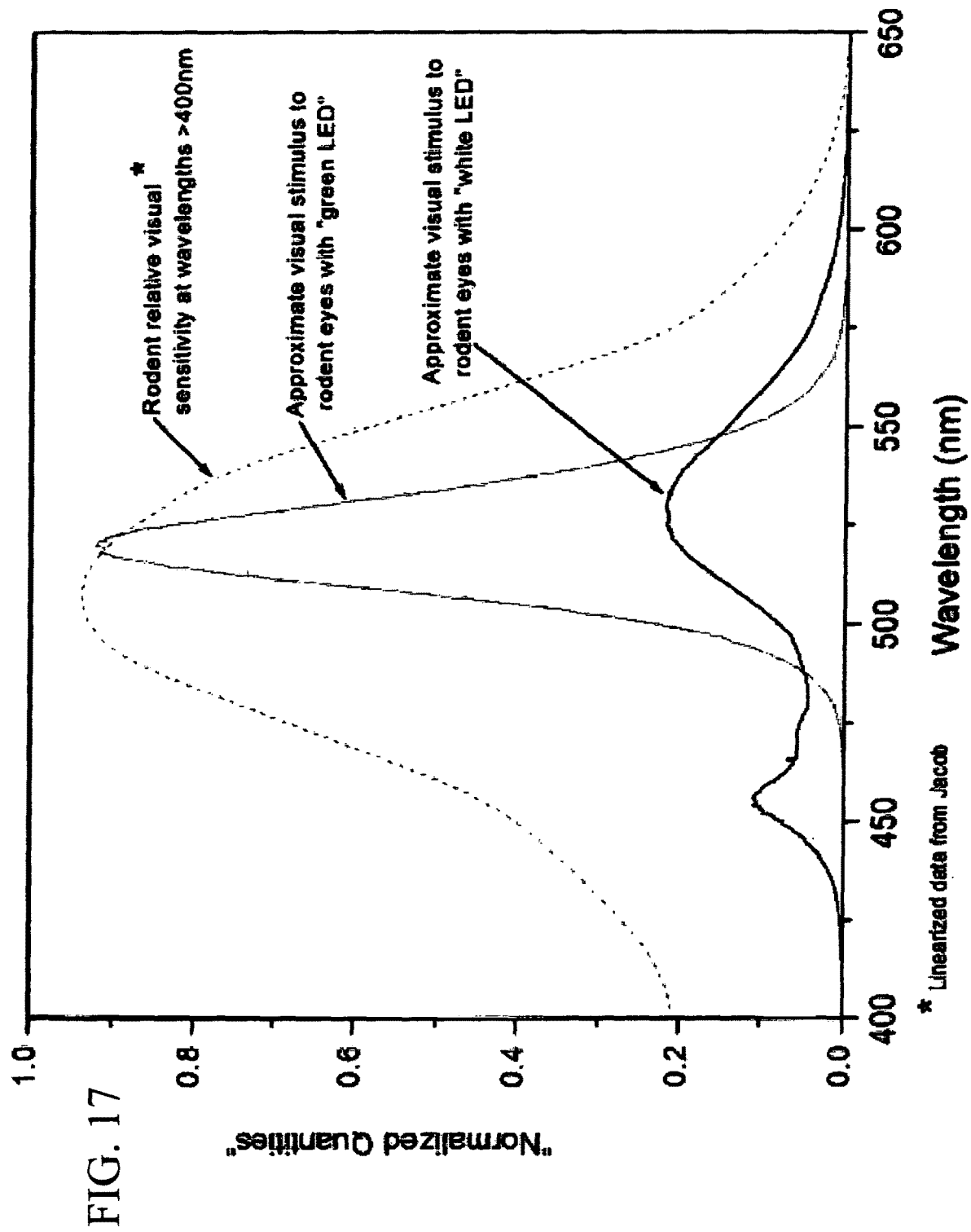
FIG. 17 shows a comparison between the prior art "white" rat light and one that operates at about 525 nm in the green close to Applicants preferred peak of 509 nm.

Applicants are aware of the existence of a commercial product that also uses light as a rodent deterrent. The product uses "white" LEDs, pulsed at a rate around 1 Hz. FIG. 17 shows the spectrum of the output from the existing commercial product, compared to Applicants' RatLite product (which is what Applicants call their device), and the spectral sensitivity of rodents to radiation at and above 400 nm. The rodent visual function curve is generated from linear data presented in the paper by Wang et al.

Figure 18:
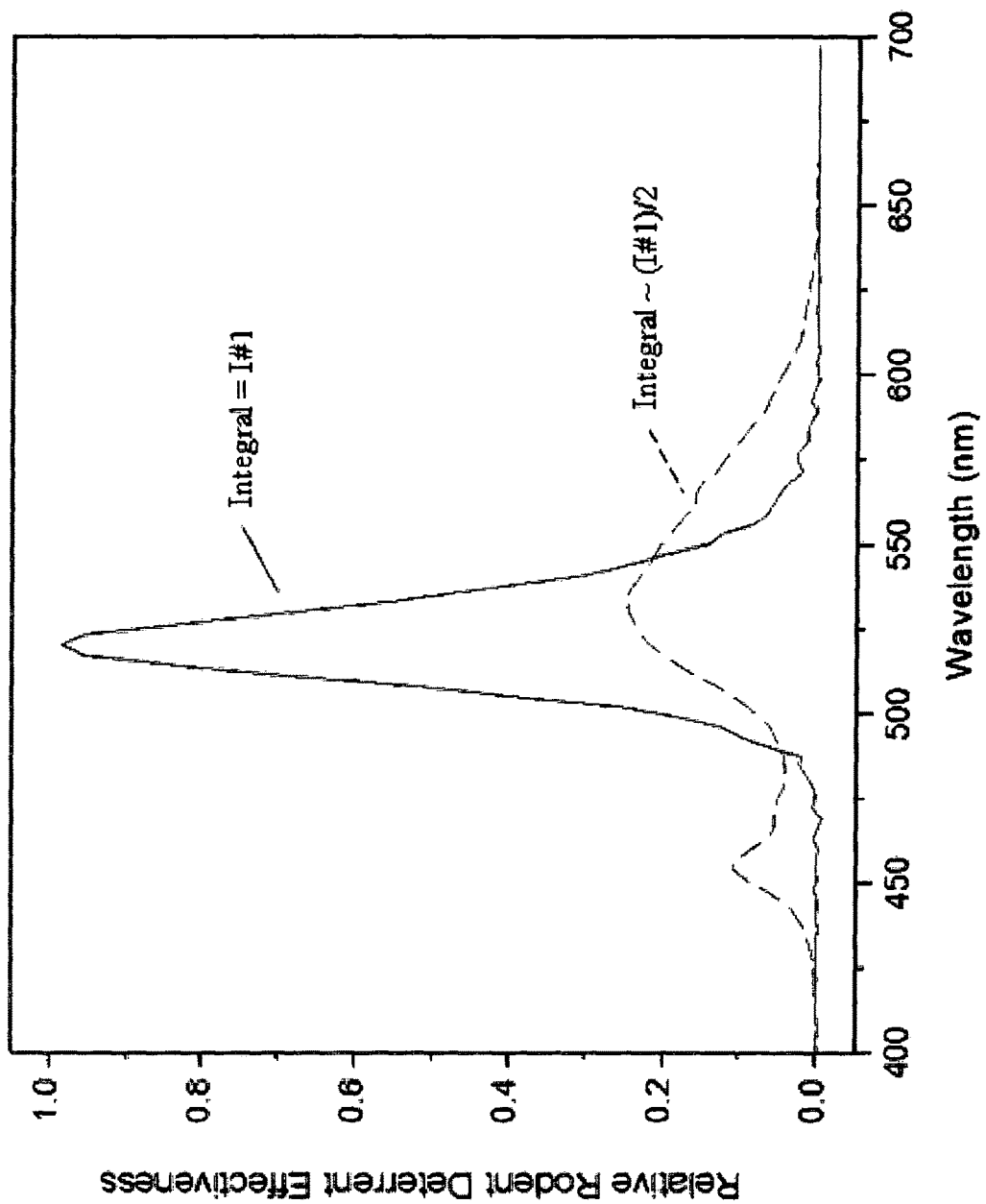
FIG. 18 depicts the relative effectiveness of "white" and green LEDs in generating stimulus in rodent eyes.

Since the "white" LED product does not emit UV light, it is compared here to just the green LED output from the RatLite product/invention. As discussed above, it is more efficient to generate light tailored to the rodents' visual wavelength sensitivity range, than to expend electrical energy by generating light at wavelengths not seen by them. In FIG. 18, the relative effectiveness of the "white" and green LEDs in generating stimulus in rodent eyes is shown.

The convolution of rodent wavelength sensitivity with the range of wavelengths emitted by the white and green LEDs is shown for the case where the total "white" LED energy output is taken to be the same as for the green LED. The convolution shown is obtained by simple multiplication of the emitted spectrum and the sensitivity spectrum of rats and mice, for each small wavelength interval from 400 nm to 650 nm. Although the mathematical precision of this simple convolution procedure is probably not as accurate as it could be, had a better knowledge of rat reactions to various wavelengths been available, to first order, it is reasonable. The integrals of the two stimulus curves for the "white" and green LEDs, show about a factor of two better efficiency using green rather than "white" LEDs. Other factors in applicant's product's favor include much easier and faster installation, no interference with the vehicle's electrical system, and a maintenance free operating life time of at least five years on 3×AA batteries as opposed to six months on two AA batteries in one of the commercial product configurations.

Prototype Tests

Applicants have conducted extended tests of prototype LED light systems lasting more than 18 months in which prototype units were utilized in engine compartment of a pickup truck and in a suburban garden. In the tests, several versions of blue LEDs were utilized successfully to deter rats from the truck and the garden. Most of the tests were conducted using three blue LEDs cut from low cost light strips (Home EVER model 4100057-Blue-A). Applicants have also experimented with Home EVER model 4100057-Blue. Both models appeared to work equally well.

Engine Compartment Tests

As indicated above an important application of the present application is to keep rats out of motor vehicle engine compartments. The impetus for the invention is that the vehicle of one of the Applicants was found to be frequented by rats that left behind empty snail shells, green messy slime, droppings and chewing damage to insulation in the engine compartment. Attempts had been made to enter the entire dashboard area, presumably as a place for nest building. This problem is common and serious. Applicants know personally of somebody whose Lexus was totaled by rat damage, and who reported a second vehicle just back after repairing $2700 worth of rat caused damage under the hood. In particular, the entire 7-OAKS housing community in Rancho Bernardo, Calif. is plagued by rat damage to vehicle engine compartments and beyond.

The original, 460 nm RatLite, continuous light emitting version was successfully tested by one of the applicants for nearly a year (350 days) in the engine compartment of a vehicle parked for long periods between outings. More importantly, as soon as the 460 nm RatLite was removed, rat(s) came back:
First night light out: droppings discovered next morning
Second night light out: droppings discovered next morning
Third night light out: droppings discovered next morning AND a rat was still in the engine compartment, discovered in a headlight assembly, presumably having decided on a good nesting site.

After the third night of testing with no light under the hood, a rat was discovered still in the engine compartment the following morning. Subsequent invasions were videotaped with an infrared camera. (The rat or rats could not see the IR LED illumination of the scene in the engine compartment since IR is outside their spectral sensitive range.)

Returning the light to the engine compartment was compromised by the bad idea of putting the light AND food in the engine compartment. It took a few days to sort this out, during which video recordings were made that showed the rat returning with the light on, presumably looking for more food. The engine compartment was cleaned out, and the hood left open for a few nights. The following mornings showed no evidence of the rat(s) returning. Next night: The applicant's first flasher unit, with one blue LED, 12 Hz flash rate was installed. There were no more rat invasions for several days with flasher in place. Then he decided to call his friend who is a patent attorney.

Garden Tests

His patent attorney friend lives next to a nature reserve and has a small garden in which he tries to grow collards, lettuce, tomatoes and kale. Patent attorney several months earlier had discovered that something was eating his kale and was told by his nursery supplier that it was probably rats. The patent attorney purchased a cage-rat trap, baited it with peanut butter and caught a rat on the first night trial. He released the rat at another location in the nature reserve about a half-mile from his house. By the time he got the call from his friend he had caught about 6 rats and released them at the same release place. The patent attorney then, over a period of about 6 months, experimented with the 460 nm blue LED lights with complete success. At first the 460 blue LEDs were powered from wall power converted with an AC/DC converter. Later he has used two battery powered LEDs. If the lights are not shining on the garden, he may or may not catch rats. But during the period of about two months preceding the filing of the Nov. 16, 2017 Provisional Application identified in the first sentence of this application, he has utilized the two-battery powered 460 nm blue LEDs described above and he has caught 5 rats when there were no lights shining on his garden. When the lights were shinning on the garden, no rats were caught. The garden is a small, 12 feet×5 feet, garden. Two three-LED modules were positioned at each 5-foot end of the garden at a height of about 18 inches above ground and directed downward at about 30 degrees from the horizontal. Again, this was before applicants made the change to wavelengths that more efficiently match rodent visual sensitivity.

The Rat Motel

Once pulsed light prototypes were available, testing of various color LEDs were started in controlled experiments. A test facility referred to by the Applicants as "The Rat Motel" was constructed. Six "rooms" were assembled from and enclosed by cardboard. The structure has a fold up roof to permit examination of the interiors of the rooms on the mornings after each test run. The "motel" was then placed outside, in a side yard, near the vehicle that originally incurred rat damage. All prototypes were run at the same average current, since we were designing for the maximum possible battery life at light levels sufficient to deter rats. The differences in light intensities emitted at the various test wavelengths are not large on logarithmic scales. Both humans and rats (or mice) share this type of visual response, allowing very large dynamic ranges of intensity to be detected.

Figure 16:
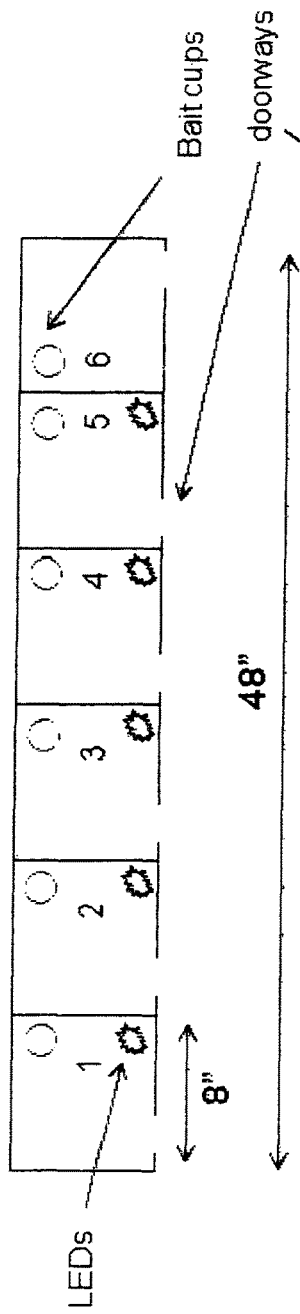
FIG. 16 shows a schematic of the "Rat Motel" used by Applicants to test optical rat deterring systems.

The physical test information was backed up by and correlated with infrared surveillance videos. FIG. 16 shows a schematic of the "Rat Motel". Note that the doorways of room #5 and room #6 are twice as far apart as other doorway pairs. This was designed to minimize light leakage from other doorways when rodents enter the dark room doorway. Optical isolation between the various rooms was taken care of by appropriately placed strips of flat black masking tape. The LED unit placements in each room are arranged so that they are not directly visible until the containing room is entered; with rodent eyes past the doorway.

The purpose was to evaluate both CW and pulsed versions of the invention. Also, several wavelengths were tested to find out which would work best. Five of the "rooms" contained light sources, and one was left dark, as a control. Various baits were placed in the rooms, and nocturnal surveillance was recorded by an IR digital video camera (DVR), located inside the house of one of the Applicants, looking out through a window above the motel. Additionally, IR flood lights were placed near the motel for proper illumination. It is known the rodents cannot see IR light, and that was confirmed in these experiments. Tests were conducted over a period of approximately 4 months.

The initial light sources tested in the five "motel" rooms were at wavelengths of: 395 nm, 450 nm, 520 nm, 650 nm and "white". Later, when they became readily commercially available, LEDs with wavelengths between 365 nm and 370 nm were tested. "White" LEDs are produced using 460 nm LEDs encased in phosphor doped plastic housings. Many tests were conducted, most involving mice, and two involving a rat or rats. We suspect that there may have been only one mouse and one rat starring in these videos. This makes the test data stronger rather than weaker, because there were two LED colors that kept even "experienced" rodents out of those respective rooms. Those two colors refer to 369 nm and 520 nm. After a few visits with no "bad" out-come, the "experienced" rodents would tend to think that entry into rooms to get food was probably safe. A summary of the test results is presented below.

Typically, in the evening part of the day, light sources of various wavelengths would be placed in each of the 5 compartments to observe rodent activity. The sixth compartment was left "dark" as a control measure as explained above. The configuration for each test evening was recorded, and the IR surveillance videos were started at dusk. The video recordings usually lasted for 9 hours. These recordings were reviewed each morning to see and confirm rodent behavior from the previous evening.

As an example, in one configuration for one evening, each of the rooms, or compartments had a small amount of dried soup mixed in a small cup against the back wall. To get to the bait, rodents had to enter the doorways. As they do, they gain line of sight to the LED(s) placed in a corner. When still outside, there is no direct view of the LEDs, and the amount of scattered light off the brown cardboard walls of the rooms is very low. Once the rodent(s) detect the odor of the bait in any given room, they stick their heads into the room far enough that the lights can shine directly into their eyes. Video surveillance records show the various reactions to spotting the lights.

Obviously, in the "dark room", there is no reaction as they go past the doorway into the room. They then spend time eating the bait before checking out the other rooms. Some examples or reactions to the different wavelength are discussed, below.

"White Room": Rat or mouse sticks its head through the doorway, and then backs out of the room. The spectrum for "white" is the same as that shown in FIGS. 17 and 18.

"Red Room—650 nm": No reaction at all. Rodents have very little sensitivity to that wavelength which matches the data provided in the Wang et. al. paper, referenced earlier. They enter, and eat the bait.

"Ultraviolet Room—395 nm": No reaction to that wavelength, also in agreement with the Wang et. al. data. In that case also, they enter and eat the bait.

"Green Room" 520 nm: Rat or mouse sticks its head through the doorway, and then backs out of the room.

"Blue Room 460 nm": Rat or mouse sticks its head through the doorway, and then backs out of the room. Applicants are not certain of the reason for this reaction; however, the rodents' reaction is consistent with Applicants' earlier engine compartment and garden tests with blue LED light at 460 nm. Rat vision at that wavelength is not as sensitive as it is at 509 nm or 370 nm UV. It seems that either the sensitivity is sufficient to cause aversion (as described above, with reference to FIG. 16), or there is something else about the 460 nm radiation that they "do not like". One possibility is that they never see that wavelength in the natural environment monochromatically. In other words, in nature the 460 nm radiation occurs as part of a relatively large continuum of wavelengths, not the relatively narrow bandwidth of approximately 10 nm that is associated with LEDs in general.

"Ultraviolet Room 369 nm": Rat or mouse sticks its head only partially into the doorway, and then jumps back in a most startled manner compared to the reactions to other colors, or wavelengths. It is known that rats are sensitive to UV wavelengths much shorter than those visible to humans.

The conditions under which rodents are repelled by light when they are functioning with dark-adapted vision are not without limits. If there is food available in the area "guarded" by LEDs, they may to ignore any perceived danger in order to get to the food. This is especially true of favored foods like peanut butter, which contains organic oils with relatively high vapor pressure. this high vapor pressure allows rodents to detect food at much greater ranges than with low vapor pressure "foods" such as dried soup mix. Also, peanut butter has higher food value and the taste is presumably superior to that from the labor-intensive crunching of dried up vegetable seeds.

Circuit Descriptions

One of the early pulsed LED circuits designed to operate near the peak efficiency of a blue LED is shown in FIG. 2. This circuit draws very little additional current beyond that consumed by the LED. This circuit operates off two 1.5-volt lithium batteries, such as Energizer AA or AAA Ultimate Lithium batteries. U1 is a Nano-Power System Timer integrated circuit. It is manufactured by Texas Instruments and is designated as TPL5111. It requires only a single external resistor to select the output frequency of the device. We selected a 10 Hz frequency, which requires resistor R1 to be 470 ohms. Other frequencies are easily selected by changing resistor R1. For example, if R1 is 1K ohms a 5 Hz pulse rate is obtained and will provide greater battery life. The TLP5111 timer circuit has an operating voltage range, VDD, of 1.8 volts to 5.5 volts, and draws only 35 Nano amps operating steady state.

The output of U1 is a square wave of 10 HZ at pin 5. This waveform is differentiated by Capacitor C1 and resister R2. The width of this differentiated pulse is set by C1 and R1. With a C1 of 1000 pf and a R2 of 10 mega-ohms, the pulse applied to the gate of field effect transistor (FET) results in the FET being turned on for 4 milliseconds. The FET Q1 is a BS170, manufactured by On Semiconductor. Diode D1 is used to suppress the negative going pulse generated by the differentiator and the square wave output of U1.

Figure 1:
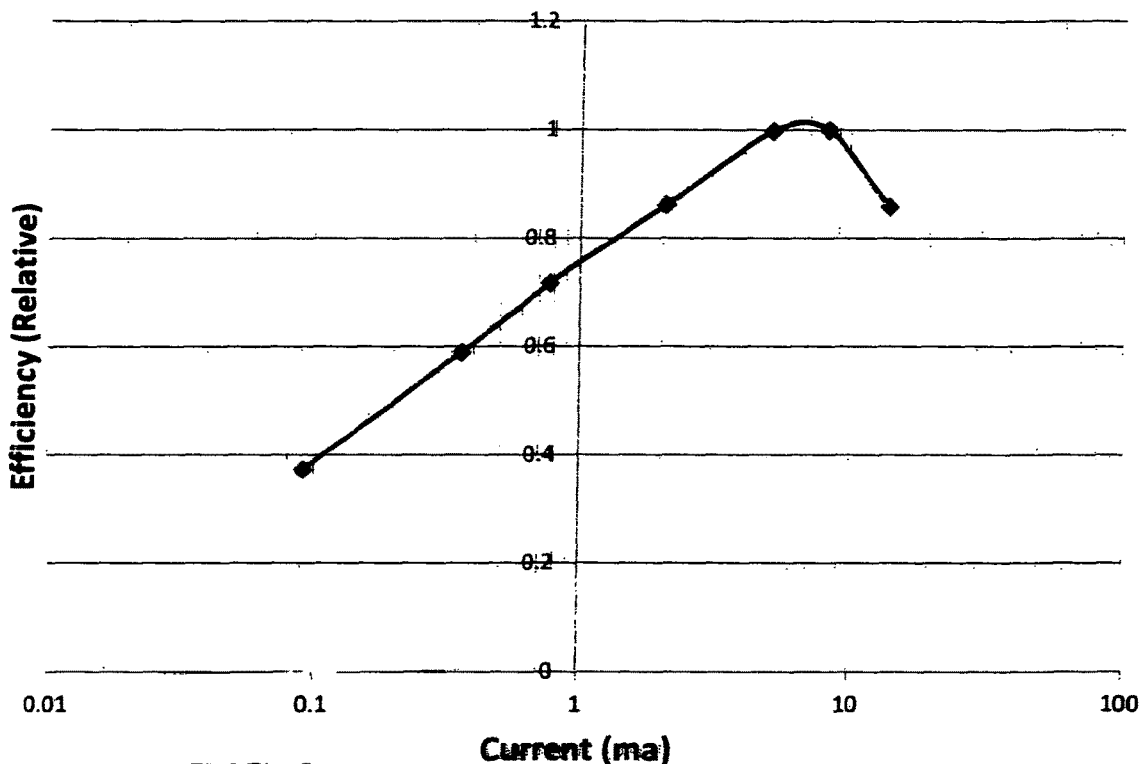
FIG. 1 shows relative efficiency of a preferred blue LED.

The Drain-Source "on resistance" of Q1 is less than 5 ohms. The current through the LED1 is therefore set by resistor R4. With R4 set at 100 ohms, the measured pulse current through the LED is 4 milli-amp, near the peak efficiency operating point. To maximize battery life, two factors in the circuit design should be met. The first is that the LEDs should be operated at currents near peak LED efficiency. That is, the number of photons out per unit of current in the device is near maximum for the device. Secondly, the current consumed by the rest of the electronic components should be negligible compared to the current in the LEDs. This circuit meets those requirements. FIG. 1 shows the efficiency of the blue LED used in this circuit. The LED in this case is near peak efficiency for currents in the range of 4 to 10 ma. If more light is desired, it would not be good in terms of battery life to just greatly increase pulse current to say 50 ma. Instead, the pulse width should be increased while keeping pulse current in the 4 to 10 ma range.

The remaining variable is the pulse width. This is set to provide the desired brightness. The resulting brightness is bright enough to repel the rodents in a darkened room, but not excessively bright which would reduce battery life. We have selected C1 and R1 to provide a pulse width of 3 ms. Since the pulse rate is 10 Hz, or 100 ms between pulses, the duty cycle is 3/100=0.03. The average current drain from the batteries is therefore 4 ma×0.03=0.12 ma, or 120 microamps. Lithium AAA and AA batteries have a capacity of 1250 and 3500 milliamp-hours respectively. The battery life using AAA batteries would be approximately 1250/0.12=10,400 hours, or about 14 months. The life using AA batteries would be about 3 times that or 3.5 years. Lithium batteries have a flat discharge curve, meaning the voltage remains near the starting voltage until the end of life when it falls rapidly. This results in little change in the circuit operating characteristics, and the light output, over the useful life of the battery.

Figure 4:
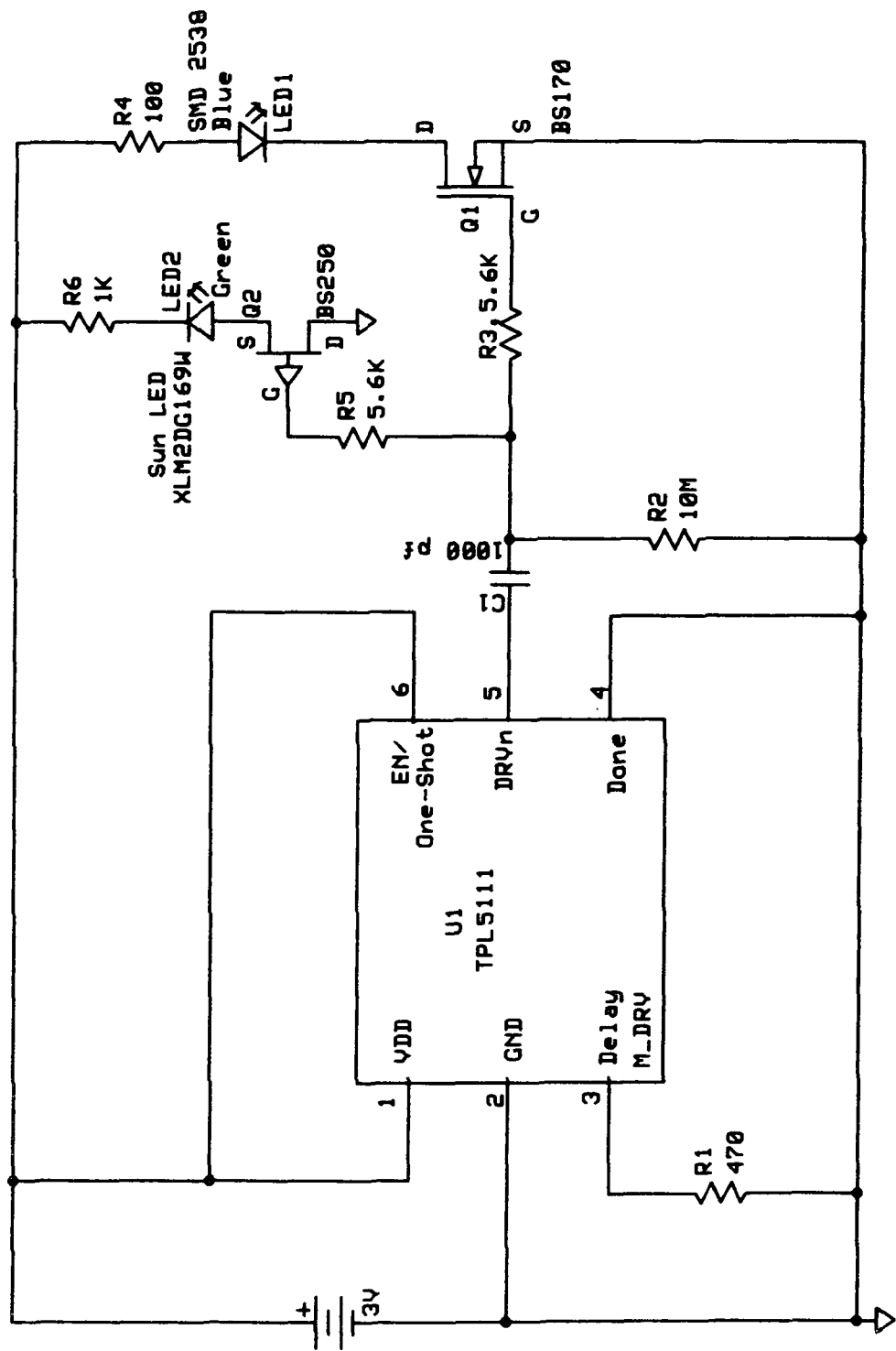
FIG. 4 shows a circuit designed to flash two LEDs alternately, each at 10 Hz.
Figure 5:
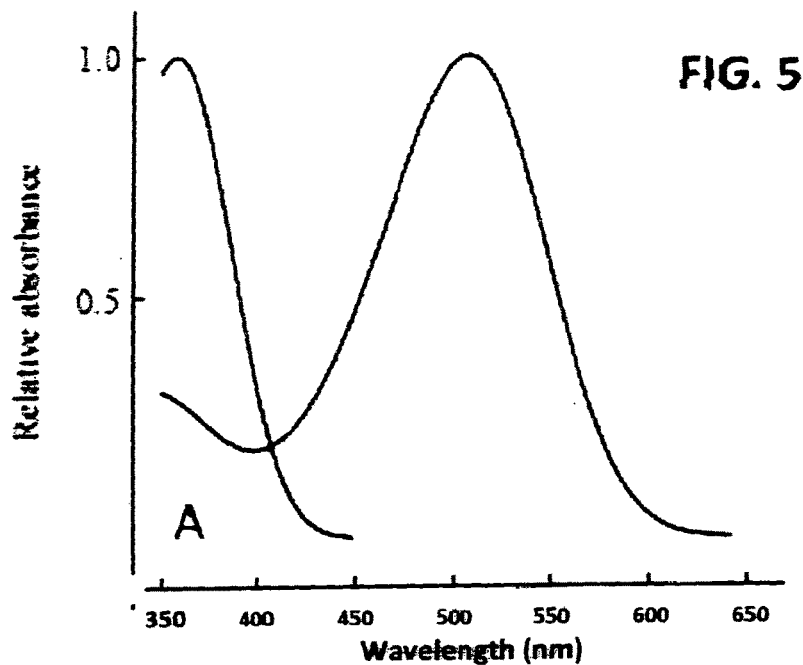
FIG. 5 is a chart showing the relative absorbance of light in rat cones as a function of wavelength from a reference by Jacob, et al.
Figure 7:
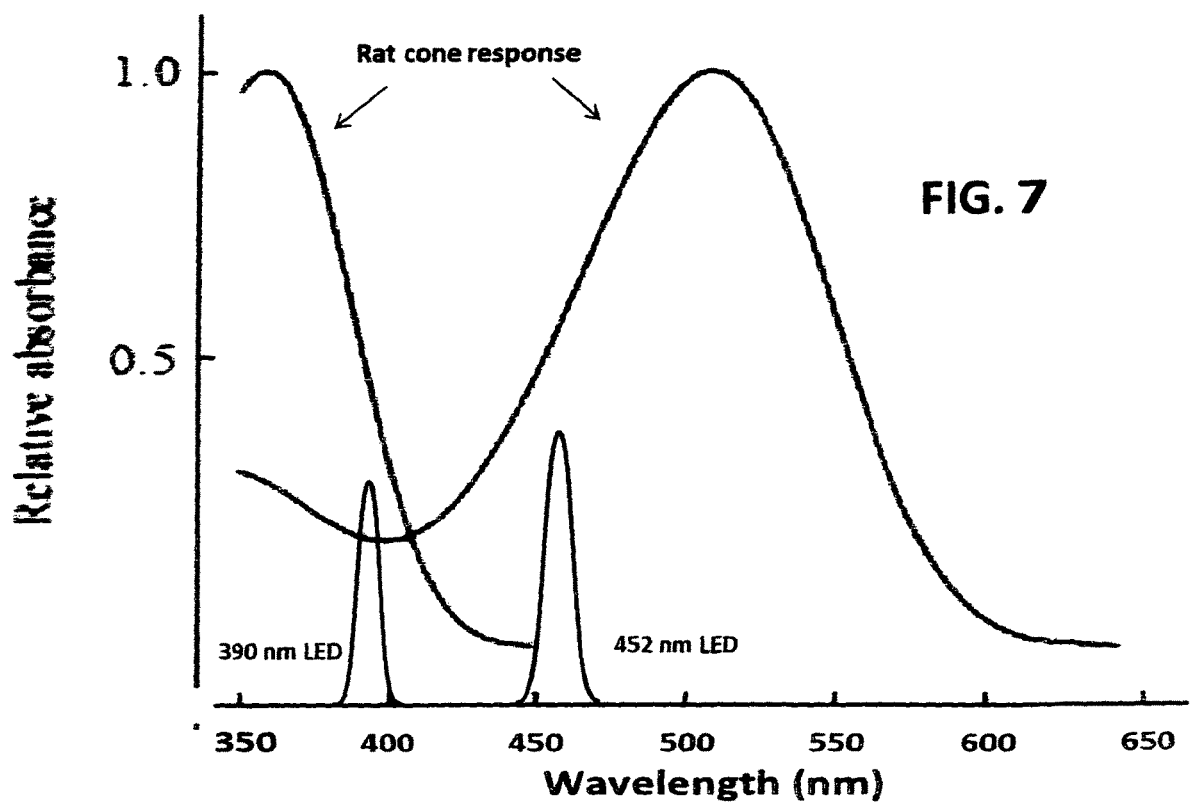
FIG. 7 is a chart showing the FIG. 5 absorbance curve with the spectra of a 390 nm LED and a 452 nm LED super-imposed on top of the absorbance curve.
Figure 6:
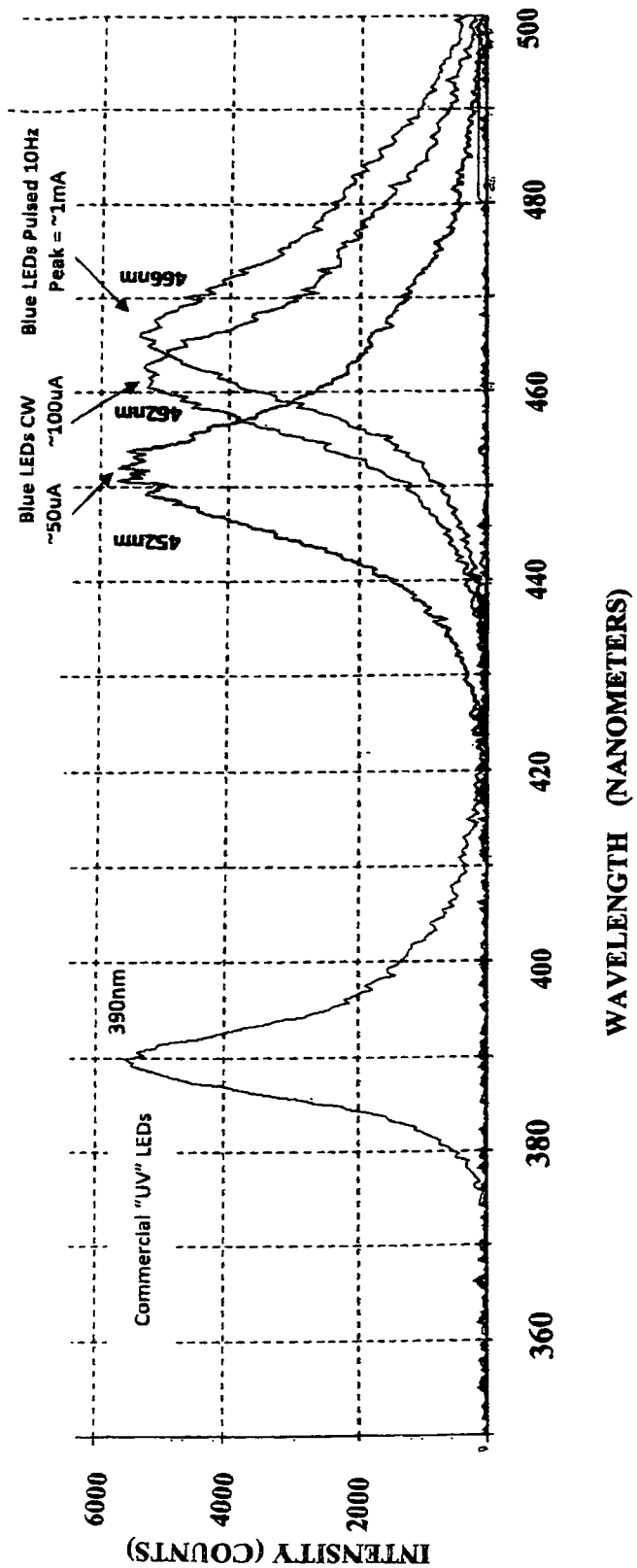
FIG. 6 shows the spectra of a commercial UV LED and commercial blue LED operated at CW and at 452 micro-amps and 462 micro-amps.
Figure 8:
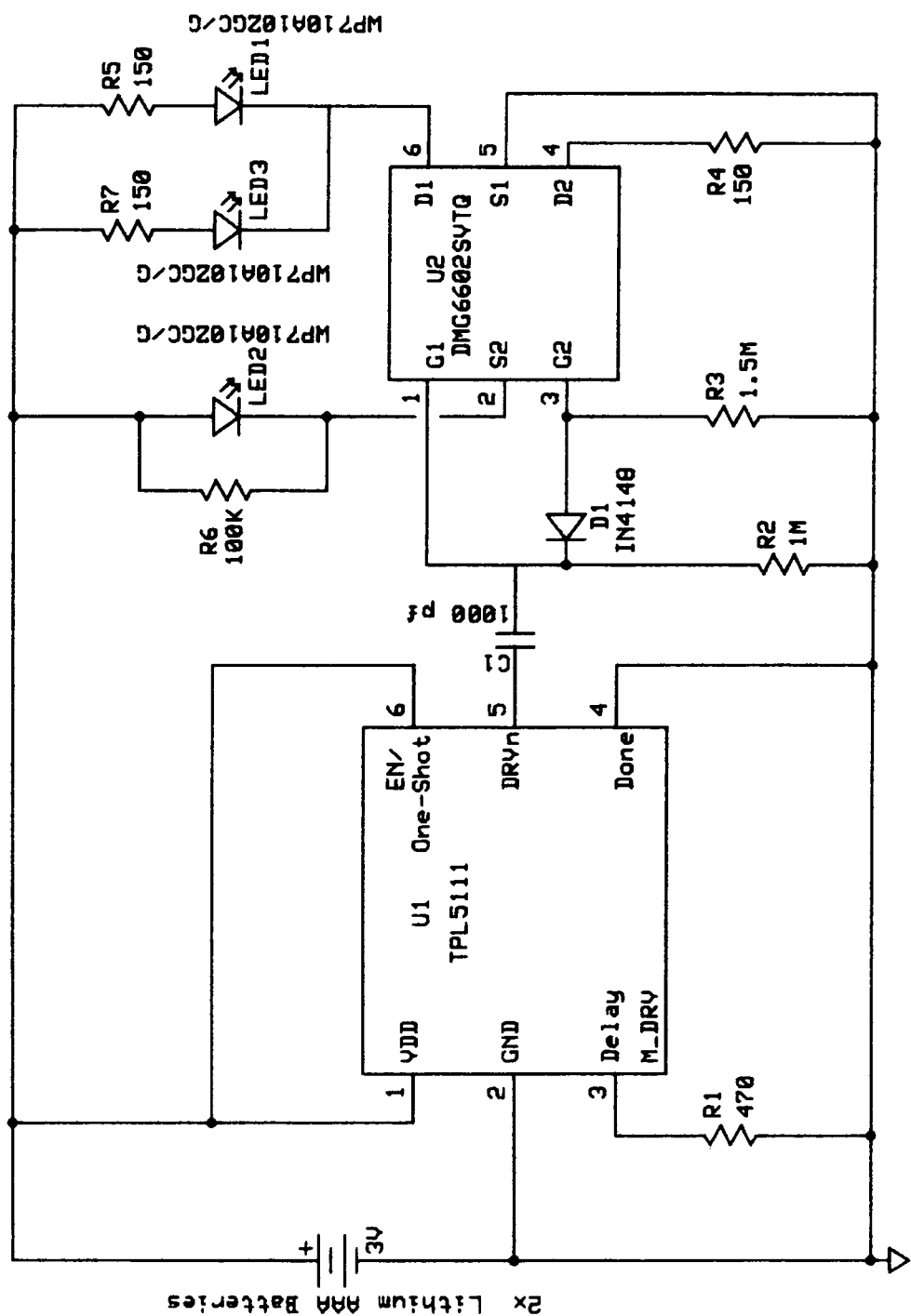
FIG. 8 shows a multi-option schematic of a preferred circuit diagram.
Figure 9:
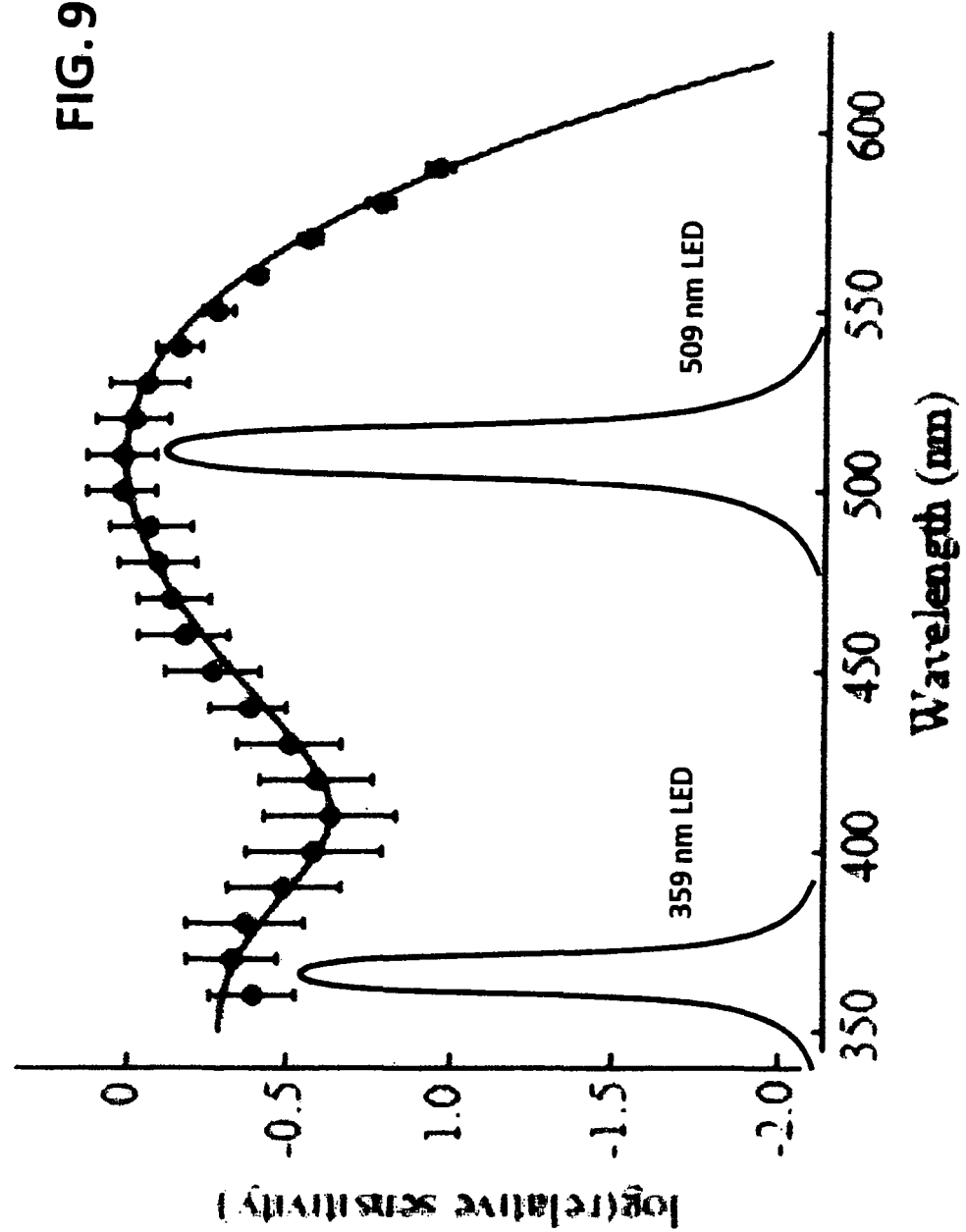
FIG. 9 shows the spectra of two LEDs matching the two absorbance spectra of rat cones.

An additional variation on the circuit of FIG. 2 is shown in FIG. 4. In this circuit both the positive and negative going part of the square wave out of U1 are used. The negative going transition is again differentiated by C1 and R2 and the pulse applied to the P type FET Q2. The current through LED 2 is set by resistor R6. In this arrangement the LEDs flash at 10 Hz, but 50 ms apart. The visual effect is somewhat different than two LEDs flashing in unison and may be even more disconcerting and annoying to rodents. The LEDs can be the same or different colors. One can also flash two LEDs in the circuit of FIG. 8 by having two LEDs and their associated load resistors in parallel in the Drain leg of Q1. In this arrangement both LEDs would flash in unison.

Figure 15:
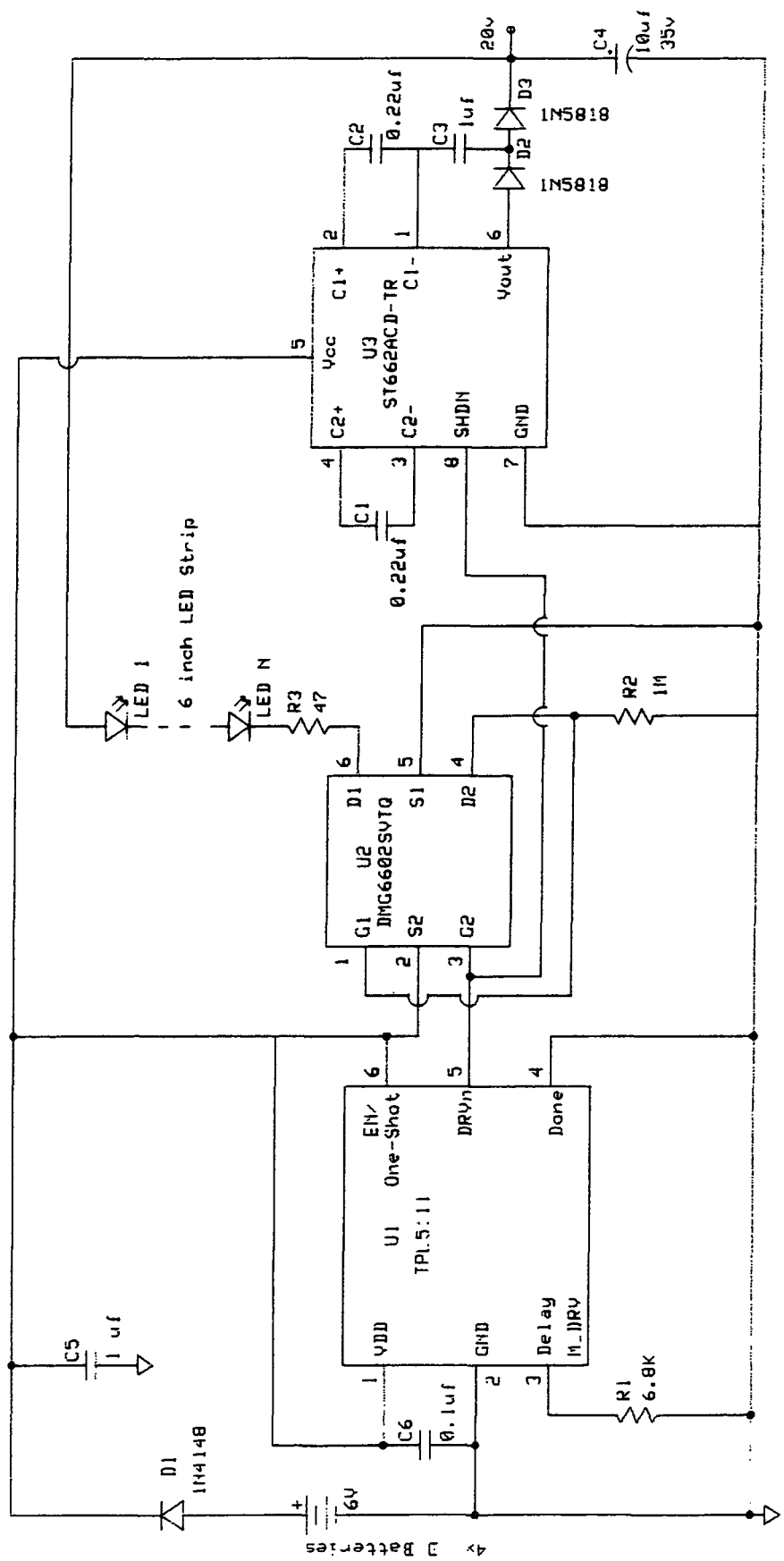
FIG. 15 shows a circuit utilizing a LED strip for protecting a large enclosed space.

In larger regions such as attics, it would take several units of the type described above to provide effective coverage. A design to accommodate such areas is possible but requires larger batteries and cannot be made to last 20 years without battery change. The following design uses four D size batteries providing a DC source of 6 volts and uses strip LEDs to provide 360-degree coverage. The circuit design is shown in FIG. 15. Diode D1 drops the voltage to U1 and U3 by 0.6 volts so that they remain under their absolute maximum operating voltage of 6 volts. With R1 set at 6.8 K ohms, timer U1 generates a 0.5 Hz signal at the output on pin 5. This output signal is high for 1,950 milli-seconds, and then low for 50 milli-seconds. U2 is a duel FET integrated circuit with one P-FET (Q2), and one N-FET (Q1). The output signal from U1 is applied to the gate of Q2 and with the load resistor R2 in the drain of Q2 inverts the signal so that a 50 milli-seconds positive going pulse is applied to the gate of Q1 every 2 seconds. Q1 then functions as a switch allowing current to flow through the strip of LEDs and the load resistor R3. U3 is a DC to DC converter and is used to provide a 20-volt supply to power the LED strip. Capacitor C4 provides the pulse current capacity needed to sustain the 50 milli-second pulses as the DC-DC converter U3 is not "stiff" enough to supply the 64-ma peak current without sagging.

A six-inch LED strip is applied around the circumference of a 1.9-inch diameter cylinder so that light emission covers 360 degrees. Strip LEDs typically come with 3 LEDs in series, with each succeeding let of 3 LEDs in parallel. The spacing of each set of 3 LEDs in series is usually 2 inches or 1 inch. Thus, the 6-inch strip contains a total of 9 or 18 LEDs depending on the type of strip. With the values shown, the pulse width is 50 milli-seconds and the peak current is 64 milli-amps. The duty cycle is 50 ms/2000 ms=0.025. The average current is then 64×0.025=1.6 milli-amps. Since the capacity of D cell Alkaline batteries is about 15,000 milli-amp hours, the batteries will last about 15,000/16=9400 hours or about 1.1 years. The flash of emitted light is bright enough in darkened rooms to illuminate large areas. Prototypes of this design have been built and tested in rat infested attics with excellent results, eliminating all rat sounds in each test in less than 24 hours. All the circuit components can be purchased from most large electronics distributor such as Digi-Key.com or Mouser.com. The strip LEDs can be purchased from Amazon.

Preferred Embodiments Using UV LEDs

With the recent availability of low cost UV LEDs emitting in the range of 350 nm to 370 nm, and our experiments confirming mice and rats reacting strongly to these wavelengths, we have developed a first improved circuit especially for small spaces such as engine compartment and a second improved circuit for large spaces such as attics and gardens. Because the forward voltage drop of these UV LEDs is greater than for the visible LEDs described in the circuits above, it is necessary to operate at a voltage higher than the 3 volts supplied by two AA or D type batteries.

Figure 13:
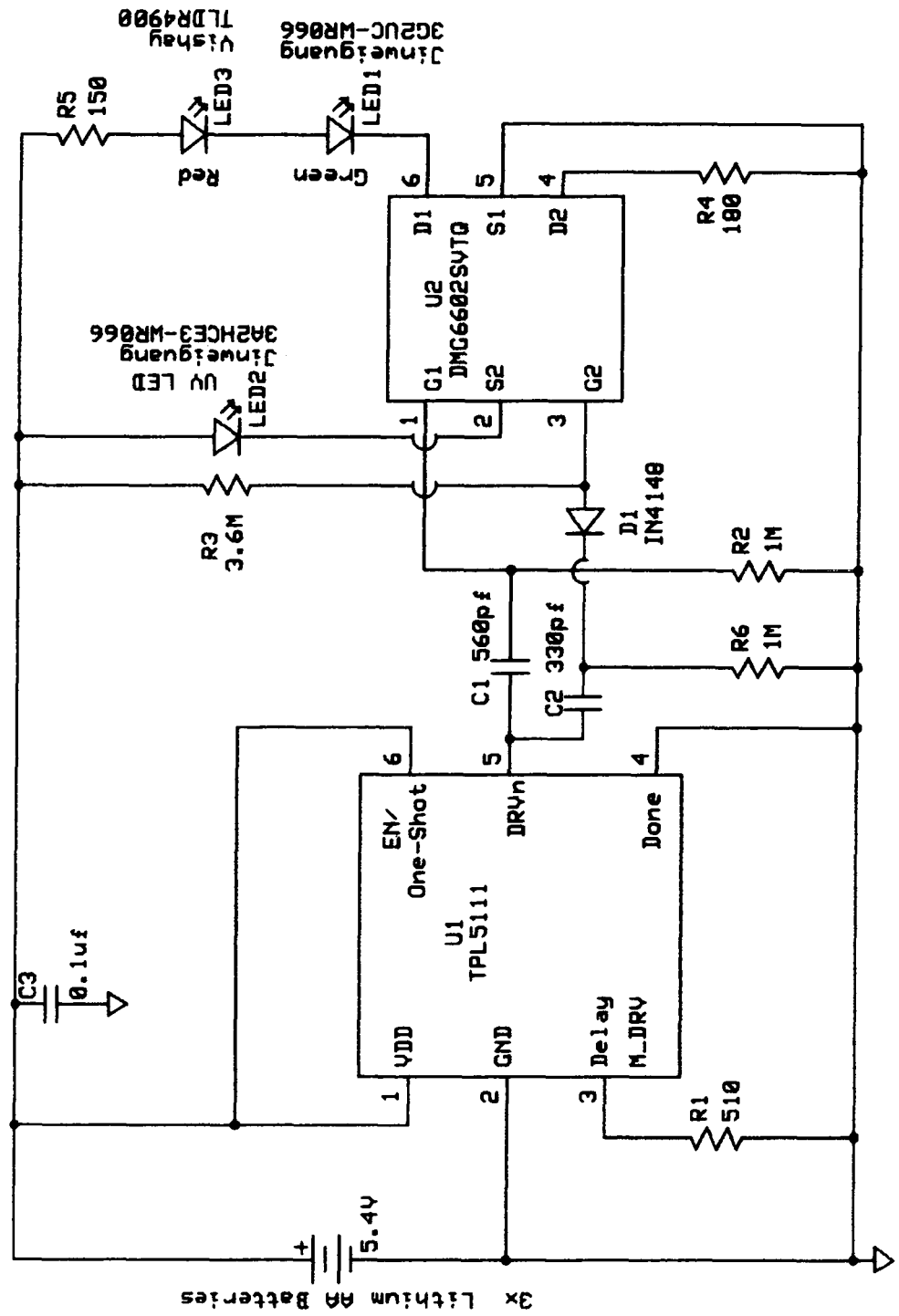
FIG. 13 shows the schematic for driving UV, Green, and Red LEDs for small area applications.

The circuit for small spaces such as engine compartments is shown in FIG. 13. This circuit uses three AA Lithium batteries that provide a supply voltage of 5.4 volts. The green and UV LEDs match the two peaks in mouse eye spectral sensitivity. The red LED is provided only for the purposes of the human observer. In our product a twin-rat logo is used and the visible LEDs are placed near the eyes of the twin-rat logo. Since the UV LED light is very weak or invisible to the human observer, the red LED provides a balanced pleasing appearance to the logo. The red LED corresponds to an "earring" worn by one of the rats. (In an alternate version of this embodiment thee red LED is replaced by a second green LED.) The forward voltage drop of the green and red LEDs in series is well under the 5.4-volt supply voltage at the current we are operating, and only a small 150-ohm resistor is needed to set the current. This results in very little wasted power in the load resistor. The green and UV LEDs flash alternately at 10 Hz, and the red flashes in unison with the green. C1 and R2 set the pulse width of the green/red leg, while C2 and R6 set the pulse width of the UV leg.

The measured parameters for this circuit are as follows:

| Parameter | Green/Red LEDs | UV LED |
| --- | --- | --- |
| Pulse Current ($I_p$) | 6.7 ma | 10.5 ma |
| Pulse Width(PW) | 0.4 ms | 0.45 ms |
| Duty Cycle(DC) | 0.004 | 0.0045 |
| Average Current ($I_{av}$) | 27 ua | 47 ua |

Figure 19:
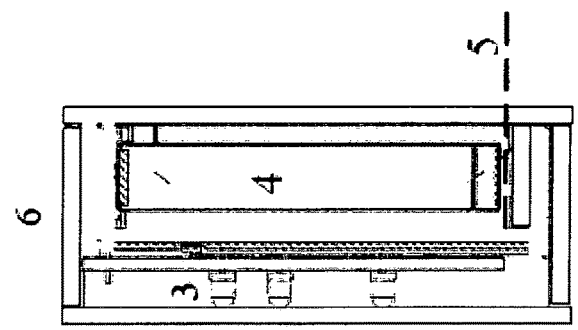
FIG. 19 is a drawing showing features of a preferred embodiment of the present invention.
Figure 19:
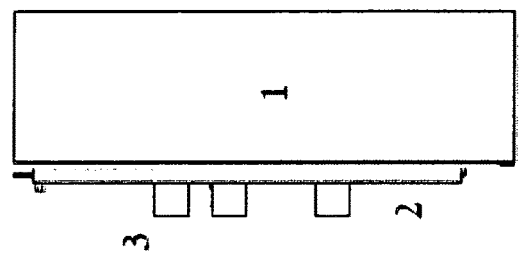
Figure 19:
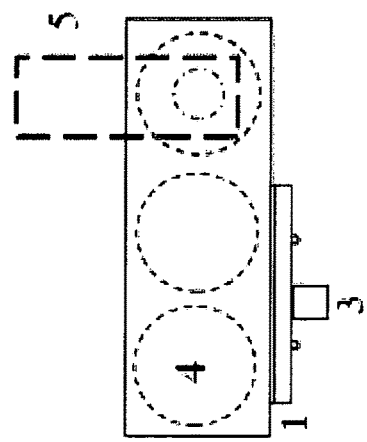
Figure 19:
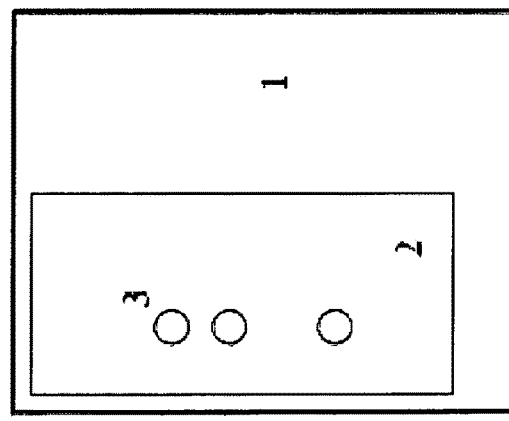

Total current = 74 ua
Battery Life = 3400 mAh/0.074 ma = 45,900 hours = 5.2 Years FIG. 19 shows a preferred housing for the FIG. 13 circuitry and describes a technique for starting the operation of embodiments described in this application. This housing is compact enough to be manufactured as a commercial product. The labels in FIG. 19 refer to the following main components proposed commercial product. These components include battery holder 1 (which is a standard, spring-loaded commercial product) to hold three lithium AA size batteries 4 and a circuit board 2 with drive circuitry. In this embodiment the three LEDs, one green, one red and one ultraviolet, are labeled 3. The LEDs are mounted on the circuit board 2. This embodiment includes a plastic isolation strip 5 that functions as a low-cost on-off switch. The isolation strip keeps the batteries fresh until the device is purchased and placed in desired locations to deter rodents. The above component are contained in a plastic housing 6 which is opaque except for a clear plastic lid through which the LEDs shine their light into the area to be protected. Removing the plastic isolation strip allows the battery housing spring to push the battery terminal against the electrical contact grommet to start the LEDs flashing. The strip can be reinserted if the users wishes to deactivate the system. In other embodiments a more typical on-off switch could be utilized, but given the invention's operating lifetime of years, may not be necessary.

Figure 14:
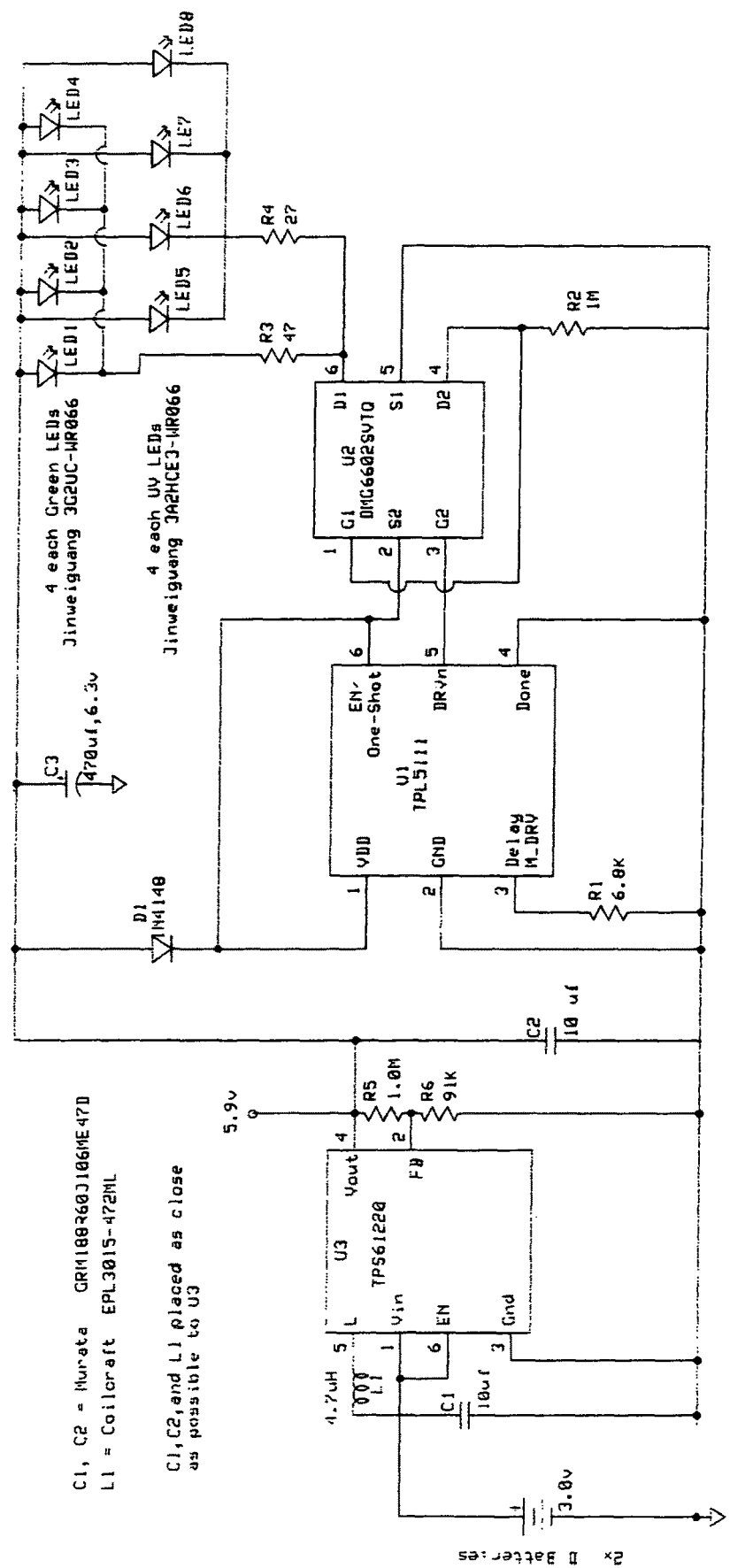
FIG. 14 shows a circuit using two D batteries for a large enclosed space.

The second UV circuit, for larger areas such as attics and gardens, is shown in the schematic of FIG. 14. U3 is a converter/regulator to boost the 3 volts from the two batteries up to 5.9 volts, just under the maximum suggested output voltage of the regulator of 6 volts. The regulator maintains the 5.9 supply voltage as the batteries discharge all the way down to 0.7 volts. With R1 set at 6.8 K ohms, the timer U1 generates a 0.5 Hz signal at the output on pin5. This output signal is high for 1,950 ms, and then low for 50 ms. U2 is a duel FET integrated circuit with one P-FET (Q2), and one N-FET (Q1). The output signal from U1 is applied to the gate of Q2, and with the load resistor R2 in the drain of Q2 inverts the signal, so that a 50 ms positive going pulse is applied to the gate of Q1 every 2 seconds. Q1 then functions as a switch allowing current to flow through the eight LEDs and the load resistors R3 and R4. The four green LEDs are arranged on a plane so that they point into angles of 0, 90, 180, and 270 degrees so that the entire 360 degrees is covered by the emitted light. The UV LEDS are similarly arranged, 45 degrees offset from the green.

With the values shown, the pulse width is 50 ms, the peak current is 34 ma in the green leg, and 46 ma in the UV leg, for a total of 80 ma. The duty cycle is 50 ms/2000 ms=0.025. The average current is then 80×0.025=2.0 mA. Since the capacity of the two D cell Alkaline batteries is approximately 30,000 mAh, and the converter efficiency is 80%, the batteries will last 0.8×30,000/2.0=12,000 hours, or 1.4 years. The flash of emitted light is bright enough in darkened rooms to illuminate large areas.

Variations

In addition to the specific embodiments described above, there are many alterations available for practicing embodiments of the present invention. In some embodiments the LEDs would need to shine through a transparent enclosure. Discrete, through-hole or surface mounted LEDs could be used. A preferred embodiment includes an optical light distribution system such as lenses, diffractive optics, diffusers or even catadioptric systems tailored to specific applications. Many other alternatives are also available to tailor the light distribution system to a specific application.

In addition to engine compartments, other places that rats like to nest include the following: campers, recreational vehicles, garages, attics, basements, crawl spaces, closets, laundries, appliance engine compartments, outdoor tool or tractor sheds, storage containers, outdoor kid's playhouses, storage compartments in barbecues and box covers for outdoor sprinklers, among other places where electrical wires are enclosed, and subject to chewing damage. Examples of this added category are: security gate controllers, traffic light controllers, cable TV boxes, circuit breaker boxes,

We claim:

1. A LED lighting system for deterring rats and mice comprising:
   A) at least one LED designed to emit light peaking at wavelengths ranges of within:

1) plus or minus 50 nm of 509 nm or
2) plus or minus 26 nm of 359 nm, wherein 509 nm and 359 nm respectively correspond approximately to peaks in the green and ultraviolet sensitivity spectrum of rat's eyes, and B) an electric circuit, with a battery contained within the system, said circuit being designed to power the at least one LED for a period of at least one year without replacement of or recharging of the contained battery;

wherein each of the at least one LEDs defines a peak efficiency, and wherein the electric circuit further includes:
1) a nano-power system timer,
2) at least one resistor external to the timer,
3) at least one capacitor external to the timer,
4) an FET designed to provide a pulsed output, defining a pulse width, and wherein the LED lighting system is designed to operate at or near the peak efficiency of each of the at least one LEDs at a current in a range of 4 to 6 mA and at a repetition rate of 5 to 10 Hz with pulse widths adjusted to get enough average light output to deter rats and mice.

2. The LED lighting system as in claim 1 wherein the wavelength ranges are within:
A) plus or minus 25 nm of 509 nm or
B) plus or minus 13 nm of 359 nm.

3. The LED lighting system as in claim 1 wherein the period of at least one year is a period of at least 5 years.

4. The LED lighting system as in claim 2 wherein the period of at least one year is a period of at least 10 years.

5. The LED lighting system as in claim 1 wherein the at least one LED is one LED designed to emit light peaking at a wavelength within 25 nm of 509 nm.

6. The LED lighting system as in claim 1 wherein the at least one LED is one LED designed to emit light peaking in a single wavelength range of within 13 nm of 359 nm.

7. The LED lighting system as in claim 1 wherein the at least one LED is at least two LEDs with at least one of the LEDs being designed to emit light peaking at a wavelength within 26 nm of 359 nm and the other LED or LEDs being designed to emit light peaking at a wavelength within 50 nm of 509 nm.

8. A LED lighting system for deterring rats and mice comprising:
A) at least one LED designed to emit light peaking at wavelengths ranges of within:
1) plus or minus 50 nm of 509 nm or
2) plus or minus 26 nm of 359 nm, wherein 509 nm and 359 nm respectively correspond approximately to peaks in the green and ultraviolet sensitivity spectrum of rat's eyes, and B) an electric circuit, with a battery contained within the system, said circuit being designed to power the at least one LED for a period of at least one year without replacement of or recharging of the contained battery;

wherein the at least one LED designed to emit light peaking at blue wavelengths at 460 nm corresponding to a tested wavelength in between 509 nm and 359 nm.

9. The LED lighting system as in claim 1 wherein the battery powered electric circuit is designed to utilize battery power for driving at least one pulsed ultraviolet LED operating at a peak wavelength of between 333 nm and 385 nm.

10. The LED lighting system as in claim 1 wherein the battery powered electric circuit is designed to utilize battery power for driving at least one pulsed green LED operating at a peak wavelength of between 459 nm and 559 nm.

11. The LED lighting system as in claim 1 wherein at least one LED is at least two LEDs defining at least two colors and the battery powered electric circuit is designed to produce flashing of the two colors alternatively.

12. The LED lighting system as in claim 11 wherein at least one of the colors is ultraviolet and at least one of the colors is green.

13. The LED lighting system as in claim 11 wherein at least one of the colors is ultraviolet, at least one of the colors is green and at least one of the colors is red.

14. The LED lighting system as in claim 1 wherein the system is designed for use in attics and the at least one LED is a plurality of LEDs arranged in a strip and the battery powered electric circuit are designed to operate the system in a pulsed mode.

15. The LED lighting system as in claim 1 wherein the system is designed for use in large enclosed spaces such as attics or basements and the at least one LED is a plurality of LEDs arranged in a strip and the battery powered electric circuit are designed to operate the system in a pulsed mode.

16. The LED lighting system as in claim 1 wherein the system is designed for large open spaces such as gardens or patios and the at least one LED is at least four LEDs arranged to provide 360-degree coverage.

17. The LED lighting system as in claim 1 wherein the system is designed for large spaces such as attics and gardens and the at least one LED is at least four green LEDs and at least four ultraviolet LEDs arranged to provide 360-degree coverage.

18. A LED lighting system for deterring rats and mice comprising:
A) at least one LED designed to emit light peaking at wavelengths ranges of within:
1) plus or minus 50 nm of 509 nm or
2) plus or minus 26 nm of 359 nm, wherein 509 nm and 359 nm respectively correspond approximately to peaks in the green and ultraviolet sensitivity spectrum of rat's eyes, and B) an electric circuit, with a battery contained within the system, said circuit being designed to power the at least one LED for a period of at least one year without replacement of or recharging of the contained battery;

wherein the system wherein the contained battery is a 3-volt battery and the at least one LED is a single 460 nm blue LED and the circuit is comprised of a timer and an external resistor, external capacitor and an FET designed to provide a pulsed output with a battery life of at least 14 months.

19. The LED lighting system as in claim 1 wherein the contained battery is a 3-volt battery and the at least one LED is two LEDs and the FET is designed to provide a pulsed output with a battery life of at least 14 months.

20. The LED lighting system as in claim 1 wherein the contained battery is a 3-volt battery and the at least one LED is two LEDs and the FET is designed to provide a pulsed output with the LEDs flashing alternatively, the system having a battery life of at least 14 months.

21. The LED lighting system as in claim 20 wherein the two LEDs are both green LEDs.

22. The LED lighting system as in claim 20 wherein the two LEDs are a green LED and a blue LED.

23. A LED lighting system for deterring rats and mice comprising:
A) at least one LED designed to emit light peaking at wavelengths ranges of within:
1) plus or minus 50 nm of 509 nm or
2) plus or minus 26 nm of 359 nm, wherein 509 nm and 359 nm respectively correspond approximately to peaks in the green and ultraviolet sensitivity spectrum of rat's eyes, and B) an electric circuit, with a battery contained within the system, said circuit being designed to power the at least one LED for a period of at least one year without replacement of or recharging of the contained battery;

wherein the lighting system and the contained battery provides a capacity at least equivalent to that of four D-size batteries providing a DC source of at least 6 volts wherein at least one LED is a strip of LEDs wrapped around a cylinder to provide 360-degree illumination.

24. The LED lighting system as in claim 1 wherein the at least one LED is at least one ultraviolet LED and at least two other LEDs.

25. The LED lighting system as in claim 24 wherein the at least two other LEDs are two green LEDs.

26. The LED lighting system as in claim 24 wherein the at least two other LEDs are a green LED and a red LED.

27. The LED lighting system as in claim 1 wherein the at least one LED is a one ultraviolet LED designed to produce ultraviolet light at a wavelength of approximately 359 nm.

28. The LED lighting system as in claim 1 wherein the at least one LED is a plurality of ultraviolet LEDs each designed to produce ultraviolet light at a wavelength of approximately 359 nm.

\* \* \* \* \*